United States Patent
Revington et al.

(10) Patent No.: US 9,404,686 B2
(45) Date of Patent: *Aug. 2, 2016

(54) PROCESS FOR DYING OIL SAND MATURE FINE TAILINGS

(75) Inventors: Adrian Revington, Fort McMurray (CA); Marvin Harvey Weiss, Calgary (CA); Patrick Wells, Fort McMurray (CA); Thomas Hann, Onoway (CA)

(73) Assignee: SUNCOR ENERGY INC., Calgary (CA)

( * ) Notice: Subject to any disclaimer, the term of this patent is extended or adjusted under 35 U.S.C. 154(b) by 1037 days.

This patent is subject to a terminal disclaimer.

(21) Appl. No.: 13/496,177

(22) PCT Filed: Sep. 15, 2009

(86) PCT No.: PCT/CA2009/001303
§ 371 (c)(1),
(2), (4) Date: Oct. 10, 2012

(87) PCT Pub. No.: WO2011/032253
PCT Pub. Date: Mar. 24, 2011

(65) Prior Publication Data
US 2013/0043165 A1  Feb. 21, 2013

(51) Int. Cl.
*C02F 1/52* (2006.01)
*C02F 11/14* (2006.01)
(Continued)

(52) U.S. Cl.
CPC ............... *F26B 5/005* (2013.01); *B01F 5/0463* (2013.01); *B01F 5/0466* (2013.01);
(Continued)

(58) Field of Classification Search
CPC ........ C02F 1/52; C02F 1/5209; C02F 1/5227; C02F 11/08; C02F 11/12; C02F 11/14; C02F 11/16; C02F 11/121; C02F 11/127; C02F 2103/365; B03B 5/60; B03B 5/62; C10G 1/00; C10G 1/04; C10G 1/045; C10G 33/00; C10G 33/06; C10C 3/14; F26B 5/00; F26B 5/08; F26B 5/005; F26B 2200/14; B01F 5/04; B01F 5/045; B01F 5/0403; B01F 5/0463; B01F 5/0466; B01F 2205/0017; B01F 2205/0034; B01F 2205/0057
USPC ........... 34/312, 313, 329, 359, 387, 389, 397; 209/156; 208/390, 391; 210/702, 710, 210/738, 770, 787, 806
See application file for complete search history.

(56) References Cited

U.S. PATENT DOCUMENTS

| | | | |
|---|---|---|---|
| 2,786,651 A | 3/1957 | Mickle | |
| 3,259,570 A | 7/1966 | Priesing et al. | |

(Continued)

FOREIGN PATENT DOCUMENTS

| | | | |
|---|---|---|---|
| CA | 1064016 A1 | 10/1979 | |
| CA | 1070864 A1 | 1/1980 | |

(Continued)

OTHER PUBLICATIONS

Kingsley Emeka Ezeagwula; "Studies on Flocculation of Kaolin Suspensions and Mature Fine Tailings", Thesis presented at the University of Alberta, Edmonton, Alberta, Fall 2008.*

(Continued)

*Primary Examiner* — Joseph Drodge
*Assistant Examiner* — Nader Hossaini
(74) *Attorney, Agent, or Firm* — Baker & Hostetler LLP

(57) ABSTRACT

A process for drying fine tailings is provided. The process, which may use a pipeline reactor system, comprises providing an in-line flow of the fine tailings; continuously introducing a flocculent solution to cause dispersion and commence flocculation of the fine tailings and may comprise rapid turbulent mixing; subjecting the fine tailings to flocculation and water release conditioning in-line to cause formation and rearrangement of flocs and increasing the yield shear stress to form flocculated fine tailings while avoiding over-shearing of the flocs; and depositing the fine tailings to allow the release of water, formation of a non-flowing fine tailings deposit and drying of the non-flowing fine tailings deposit. The process enables effective in-line dispersion, flocculation and water release, resulting in reliable deposition and drying of the fine tailings deposit.

69 Claims, 15 Drawing Sheets

(51) Int. Cl.
*C02F 11/16* (2006.01)
*C10G 1/04* (2006.01)
*F26B 5/00* (2006.01)
*B01F 5/04* (2006.01)
*B01F 5/00* (2006.01)
*C02F 11/00* (2006.01)
*C02F 103/36* (2006.01)

(52) U.S. Cl.
CPC ............ *C02F 1/5209* (2013.01); *C02F 1/5227* (2013.01); *C10G 1/045* (2013.01); *B01F 2005/0034* (2013.01); *C02F 11/008* (2013.01); *C02F 11/14* (2013.01); *C02F 2103/365* (2013.01)

(56) References Cited

U.S. PATENT DOCUMENTS

| | | | |
|---|---|---|---|
| 3,319,579 A | 5/1967 | Stack | |
| 3,642,619 A | 2/1972 | Lo Sasso et al. | |
| 3,853,616 A | 12/1974 | Rundell et al. | |
| 4,110,401 A * | 8/1978 | Hoover et al. | 75/749 |
| 4,225,433 A * | 9/1980 | Liu | C10G 1/045 210/702 |
| 4,242,098 A | 12/1980 | Braun et al. | |
| 4,399,039 A * | 8/1983 | Yong | B03B 9/02 208/390 |
| 4,437,998 A * | 3/1984 | Yong | B01D 21/00 208/424 |
| 4,487,553 A | 12/1984 | Nagata | |
| 4,702,844 A | 10/1987 | Flesher et al. | |
| 4,767,540 A | 8/1988 | Spitzer et al. | |
| 5,145,256 A * | 9/1992 | Wiemers | B01F 5/061 137/808 |
| 5,183,335 A | 2/1993 | Lang et al. | |
| 5,645,714 A * | 7/1997 | Strand | C10G 1/045 208/390 |
| 5,722,042 A * | 2/1998 | Kimura | H04B 7/195 342/352 |
| 5,733,462 A | 3/1998 | Mallon et al. | |
| 5,839,828 A | 11/1998 | Glanville | |
| 5,843,320 A | 12/1998 | Huang et al. | |
| 5,925,714 A | 7/1999 | Larson et al. | |
| 5,951,955 A | 9/1999 | Flieg et al. | |
| 5,985,992 A | 11/1999 | Chen | |
| 6,077,441 A | 6/2000 | Luke | |
| 7,504,445 B2 | 3/2009 | Collin | |
| 9,011,972 B2 * | 4/2015 | Moffett | C04B 28/24 427/136 |
| 9,068,776 B2 * | 6/2015 | Bugg | F26B 5/00 |
| 2005/0150844 A1 * | 7/2005 | Hyndman | C10G 1/045 210/750 |
| 2009/0206040 A1 * | 8/2009 | Berg | C02F 1/54 210/728 |
| 2010/0104744 A1 * | 4/2010 | Moffett | C04B 28/24 427/138 |
| 2010/0147516 A1 * | 6/2010 | Betzer-Zilevitch | B03D 1/02 166/272.6 |
| 2011/0272362 A1 * | 11/2011 | Sikes | C02F 1/56 210/705 |
| 2012/0018383 A1 * | 1/2012 | Sortwell | B01D 21/01 210/667 |

FOREIGN PATENT DOCUMENTS

| | | | |
|---|---|---|---|
| CA | 1071339 A1 | 2/1980 |
| CA | 1076275 A1 | 4/1980 |
| CA | 1085762 A1 | 9/1980 |
| CA | 1087133 A1 | 10/1980 |
| CA | 1091604 A1 | 12/1980 |
| CA | 1109408 A1 | 9/1981 |
| CA | 1110950 A1 | 10/1981 |
| CA | 1119985 A1 | 3/1982 |
| CA | 1122730 A1 | 4/1982 |
| CA | 1123309 A1 | 5/1982 |
| CA | 1123977 A1 | 5/1982 |
| CA | 1140281 A1 | 1/1983 |
| CA | 1162869 A1 | 2/1984 |
| CA | 1165712 A1 | 4/1984 |
| CA | 1180827 A1 | 1/1985 |
| CA | 1182418 A1 | 2/1985 |
| CA | 1188435 A1 | 6/1985 |
| CA | 2004549 A1 | 6/1990 |
| CA | 2005681 A1 | 6/1990 |
| CA | 2006795 A1 | 6/1990 |
| CA | 1273888 A1 | 9/1990 |
| CA | 2012097 A1 | 9/1990 |
| CA | 1277449 C | 12/1990 |
| CA | 2006483 A1 | 6/1991 |
| CA | 2077453 A1 | 10/1991 |
| CA | 2042162 A1 | 12/1991 |
| CA | 2075946 A1 | 12/1991 |
| CA | 2076011 A1 | 12/1991 |
| CA | 2052742 A1 | 4/1992 |
| CA | 1301692 C | 5/1992 |
| CA | 2060042 A1 | 8/1992 |
| CA | 2114436 A1 | 2/1993 |
| CA | 2059828 A1 | 3/1993 |
| CA | 2115153 A1 | 3/1993 |
| CA | 2120005 A1 | 4/1993 |
| CA | 2084129 A1 | 6/1993 |
| CA | 2088320 A1 | 7/1993 |
| CA | 2128339 A1 | 8/1993 |
| CA | 2097127 A1 | 12/1993 |
| CA | 2137134 A1 | 12/1993 |
| CA | 2137139 A1 | 12/1993 |
| CA | 2099472 A1 | 1/1994 |
| CA | 2105333 A1 | 3/1994 |
| CA | 2127427 A1 | 1/1995 |
| CA | 1334562 C | 2/1995 |
| CA | 2143016 A1 | 8/1995 |
| CA | 2159328 A1 | 8/1995 |
| CA | 2159329 A1 | 8/1995 |
| CA | 2145939 A1 | 10/1995 |
| CA | 2123076 A1 | 11/1995 |
| CA | 2192388 A1 | 12/1995 |
| CA | 2130587 A1 | 2/1996 |
| CA | 2195448 A1 | 2/1996 |
| CA | 2204365 A1 | 5/1996 |
| CA | 2165385 A1 | 6/1996 |
| CA | 2729089 A1 | 7/1996 |
| CA | 2169875 A1 | 8/1996 |
| CA | 2183380 A1 | 8/1996 |
| CA | 2172122 A1 | 9/1996 |
| CA | 2189850 A1 | 9/1996 |
| CA | 2216847 A1 | 10/1996 |
| CA | 2217294 A1 | 10/1996 |
| CA | 2223855 A1 | 2/1997 |
| CA | 2182251 A1 | 5/1997 |
| CA | 2206143 A1 | 5/1997 |
| CA | 2235006 A1 | 5/1997 |
| CA | 1339285 C | 8/1997 |
| CA | 2247184 A1 | 9/1997 |
| CA | 2258751 A1 | 12/1997 |
| CA | 2210865 A1 | 1/1998 |
| CA | 2249367 A1 | 1/1998 |
| CA | 2260070 A1 | 1/1998 |
| CA | 2264803 A1 | 4/1998 |
| CA | 2268075 A1 | 4/1998 |
| CA | 1339850 C | 5/1998 |
| CA | 2276698 A1 | 7/1998 |
| CA | 2277098 A1 | 7/1998 |
| CA | 2287996 A1 | 11/1998 |
| CA | 2291669 A1 | 12/1998 |
| CA | 2243608 A1 | 2/1999 |
| CA | 2248479 A1 | 3/1999 |
| CA | 2306797 A1 | 5/1999 |
| CA | 2313544 A1 | 6/1999 |
| CA | 2317636 A1 | 7/1999 |
| CA | 2319419 A1 | 8/1999 |
| CA | 2326355 A1 | 10/1999 |
| CA | 2333508 A1 | 12/1999 |
| CA | 2334196 A1 | 12/1999 |

(56) References Cited

FOREIGN PATENT DOCUMENTS

| | | |
|---|---|---|
| CA | 2334744 A1 | 12/1999 |
| CA | 2346249 A1 | 4/2000 |
| CA | 2362134 A1 | 9/2000 |
| CA | 2365347 A1 | 10/2000 |
| CA | 2368604 A1 | 10/2000 |
| CA | 2378718 A1 | 1/2001 |
| CA | 2378131 A1 | 3/2001 |
| CA | 2407869 A1 | 12/2001 |
| CA | 2418483 A1 | 2/2002 |
| CA | 2364854 A1 | 6/2002 |
| CA | 2429476 A1 | 6/2002 |
| CA | 02370922 A1 | 8/2002 |
| CA | 2392246 A1 | 1/2003 |
| CA | 2465649 A1 | 6/2003 |
| CA | 2441969 A1 | 5/2004 |
| CA | 2504890 A1 | 5/2004 |
| CA | 2515581 A1 | 7/2004 |
| CA | 2532792 A1 | 3/2005 |
| CA | 2532953 A1 | 3/2005 |
| CA | 2535702 A1 | 3/2005 |
| CA | 2483501 A1 | 5/2005 |
| CA | 2546112 A1 | 6/2005 |
| CA | 2557802 A1 | 10/2005 |
| CA | 2558038 A1 | 10/2005 |
| CA | 2558092 A1 | 10/2005 |
| CA | 2558143 A1 | 10/2005 |
| CA | 2562996 A1 | 10/2005 |
| CA | 2591884 A1 | 7/2006 |
| CA | 2592586 A1 | 7/2006 |
| CA | 2592590 A1 | 7/2006 |
| CA | 2594243 A1 | 7/2006 |
| CA | 2594856 A1 | 7/2006 |
| CA | 2596648 A1 | 8/2006 |
| CA | 2512324 A1 | 1/2007 |
| CA | 2628270 A1 | 5/2007 |
| CA | 2636135 A1 | 7/2007 |
| CA | 2641582 A1 | 8/2007 |
| CA | 2645450 A1 | 9/2007 |
| CA | 2651440 A1 | 11/2007 |
| CA | 2651767 A1 | 11/2007 |
| CA | 2651863 A1 | 11/2007 |
| CA | 2567185 A1 | 4/2008 |
| CA | 2665579 A1 | 5/2008 |
| CA | 2672578 A1 | 7/2008 |
| CA | 2582059 A1 | 9/2008 |
| CA | 2667281 A1 | 9/2008 |
| CA | 2677846 A1 | 9/2008 |
| CA | 2684493 A1 | 10/2008 |
| CA | 2594182 A1 | 1/2009 |
| CA | 2634748 A1 | 1/2009 |
| CA | 2606312 A1 | 4/2009 |
| CA | 2653582 A1 | 8/2009 |
| CA | 2674660 A1 | 11/2009 |
| CA | 2665350 A1 | 12/2009 |
| CA | 2701317 A1 | 3/2011 |
| EP | 1 371 614 A1 | 12/2003 |
| FR | 2577563 A1 | 8/1986 |
| FR | 2582663 A1 | 12/1986 |
| FR | 2588818 A1 | 4/1987 |
| FR | 2589145 A1 | 4/1987 |
| FR | 2637649 A1 | 4/1990 |
| FR | 2666080 A3 | 2/1992 |
| FR | 2678629 A1 | 1/1993 |
| FR | 2700771 A1 | 7/1994 |
| FR | 2712306 A1 | 5/1995 |
| FR | 2718656 A1 | 10/1995 |
| GB | 1184003 A | 3/1970 |
| GB | 2270519 A | 3/1994 |
| WO | 9821271 A1 | 5/1998 |
| WO | 0053641 A1 | 9/2000 |
| WO | 0053816 A1 | 9/2000 |
| WO | 0058378 A1 | 10/2000 |
| WO | 0117914 A1 | 3/2001 |
| WO | 0122795 A1 | 4/2001 |
| WO | 0125493 A1 | 4/2001 |
| WO | 0164179 A1 | 9/2001 |
| WO | 0197772 A1 | 12/2001 |
| WO | 0204367 A1 | 1/2002 |
| WO | 0210225 A1 | 2/2002 |
| WO | 0234796 A1 | 5/2002 |
| WO | 0244093 A1 | 6/2002 |
| WO | 02057322 A1 | 7/2002 |
| WO | 02079099 A1 | 10/2002 |
| WO | 02083258 A2 | 10/2002 |
| WO | 03066800 A2 | 8/2003 |
| WO | 2004020395 A1 | 3/2004 |
| WO | 2004060819 A1 | 7/2004 |
| WO | 2004089322 A1 | 10/2004 |
| WO | 2005040240 A2 | 5/2005 |
| WO | 2005053748 A1 | 6/2005 |
| WO | 2005079965 A1 | 9/2005 |
| WO | 2005087712 A1 | 9/2005 |
| WO | 2005100423 A1 | 10/2005 |
| WO | 2006021708 A1 | 3/2006 |
| WO | 2006070147 A2 | 7/2006 |
| WO | 2008107034 A2 | 9/2008 |
| WO | 2009009887 A1 | 1/2009 |
| WO | 2009040166 A1 | 4/2009 |
| WO | 2009044075 A1 | 4/2009 |
| WO | 2009127893 A1 | 10/2009 |

OTHER PUBLICATIONS

Sworska, A., et al., "Flocculation of the Syncrude fine tailings. Part I. Effect of pH, polymer dosage and Mg2+ anmd Ca2+ cations", Int. J. Miner. Process 60 (2000) 143-52 [Document 892].

Sworska, A., et a., "Flocculation of the Syncrude fine tailings. Part II. Effect of hydrodynamic condictions", Int. J. Miner. Process 60 (2000) 153-61.

Kasperski, K.L., "A Review of Properties and Treatment of Oil Sands Tailings", AOSTRA Journal of Research (1991), vol. 8, pp. 1-43.

Wells, P.S., et al. "MFT Drying—Case Study in the Use of Rheological Modification and Dewatering Through Thin Lift Deposition in the Oil Sands of Alberta" (2007).

Omotoso, D. et al., "Polymer Dosing of MFT as a Function of Clay Activity" (2009).

Vrale et al., "Rapid Mixing in Water Treatment", Jour. AWWA, Jan. 1971, pp. 52-58.

Owen et al., "Using turbulent pipe flow to stud the factors affecting polymer-bridging flocculation of mineral systems", International Journal of Mineral Processing, Elsevier, 2008.

Ezeagwula, Kingsley Emeka, Studies on flocculation of kaolin suspensions and mature fine tailings, Department of Chemical and Materials Engineering, University of Alberta, 2008.

INYO Process, Sludge polymer injection wafer four port, Apr. 3, 2007.

Franks, G. et al., Aggregate size and density after shearing, implications for dewatering fine tailings with hydrocyclones, International Journal of Mineral Processing, vol. 77, p. 46-52, 2005.

J. Gregory, "Polymer Adsorption and Flocculation in Sheared Suspensions", Colloids and Surfaces, vol. 31, 1988, pp. 231-253, Elsevier Science Publishers B.V., Amsterdam.

* cited by examiner

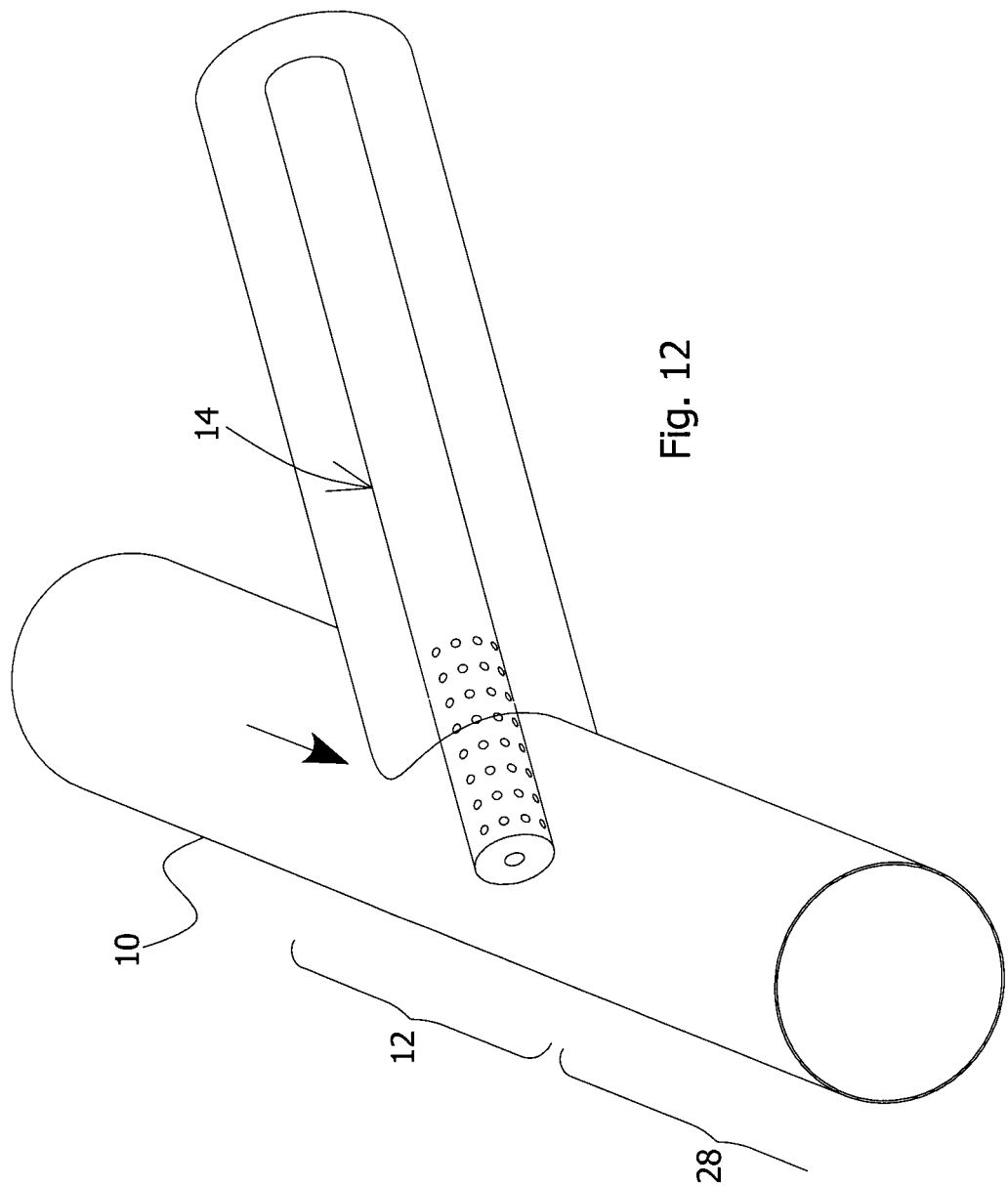

US 9,404,686 B2

PROCESS FOR DYING OIL SAND MATURE FINE TAILINGS

CROSS-REFERENCE TO RELATED APPLICATIONS

This application is a National Stage of International Patent Application No. PCT/CA2009/001303, filed on Sep. 15, 2009, the disclosure of which is incorporated herein by reference in its entirety.

FIELD OF THE INVENTION

The present invention generally relates to the field of treating oil sand fine tailings.

BACKGROUND

Oil sand fine tailings have become a technical, operational, environmental, economic and public policy issue.

Oil sand tailings are generated from hydrocarbon extraction process operations that separate the valuable hydrocarbons from oil sand ore. All commercial hydrocarbon extraction processes use variations of the Clark Hot Water Process in which water is added to the oil sands to enable the separation of the valuable hydrocarbon fraction from the oil sand minerals. The process water also acts as a carrier fluid for the mineral fraction. Once the hydrocarbon fraction is recovered, the residual water, unrecovered hydrocarbons and minerals are generally referred to as "tailings".

The oil sand industry has adopted a convention with respect to mineral particle sizing. Mineral fractions with a particle diameter greater than 44 microns are referred to as "sand". Mineral fractions with a particle diameter less than 44 microns are referred to as "fines". Mineral fractions with a particle diameter less than 2 microns are generally referred to as "clay", but in some instances "clay" may refer to the actual particle mineralogy. The relationship between sand and fines in tailings reflects the variation in the oil sand ore make-up, the chemistry of the process water and the extraction process.

Conventionally, tailings are transported to a deposition site generally referred to as a "tailings pond" located close to the oil sands mining and extraction facilities to facilitate pipeline transportation, discharging and management of the tailings. Due to the scale of operations, oil sand tailings ponds cover vast tracts of land and must be constructed and managed in accordance with regulations. The management of pond location, filling, level control and reclamation is a complex undertaking given the geographical, technical, regulatory and economic constraints of oil sands operations.

Each tailings pond is contained within a dyke structure generally constructed by placing the sand fraction of the tailings within cells or on beaches. The process water, unrecovered hydrocarbons, together with sand and fine minerals not trapped in the dyke structure flow into the tailings pond. Tailings streams initially discharged into the ponds may have fairly low densities and solids contents, for instance around 0.5-10 wt %.

In the tailings pond, the process water, unrecovered hydrocarbons and minerals settle naturally to form different strata. The upper stratum is primarily water that may be recycled as process water to the extraction process. The lower stratum contains settled residual hydrocarbon and minerals which are predominately fines. This lower stratum is often referred to as "mature fine tailings" (MFT). Mature fine tailings have very slow consolidation rates and represent a major challenge to tailings management in the oil sands industry.

The composition of mature fine tailings is highly variable. Near the top of the stratum the mineral content is about 10 wt % and through time consolidates up to 50 wt % at the bottom of the stratum. Overall, mature fine tailings have an average mineral content of about 30 wt %. While fines are the dominant particle size fraction in the mineral content, the sand content may be 15 wt % of the solids and the clay content may be up to 75 wt % of the solids, reflecting the oil sand ore and extraction process. Additional variation may result from the residual hydrocarbon which may be dispersed in the mineral or may segregate into mat layers of hydrocarbon. The mature fine tailings in a pond not only has a wide variation of compositions distributed from top to bottom of the pond but there may also be pockets of different compositions at random locations throughout the pond.

Mature fine tailings behave as a fluid-like colloidal material. The fact that mature fine tailings behave as a fluid significantly limits options to reclaim tailings ponds. In addition, mature fine tailings do not behave as a Newtonian fluid, which makes continuous commercial scale treatments for dewatering the tailings all the more challenging. Without dewatering or solidifying the mature fine tailings, tailings ponds have increasing economic and environmental implications over time.

There are some methods that have been proposed for disposing of or reclaiming oil sand tailings by attempting to solidify or dewater mature fine tailings. If mature fine tailings can be sufficiently dewatered so as to convert the waste product into a reclaimed firm terrain, then many of the problems associated with this material can be curtailed or completely avoided. As a general guideline target, achieving a solids content of 75 wt % for mature fine tailings is considered sufficiently "dried" for reclamation.

One known method for dewatering MFT involves a freeze-thaw approach. Several field trials were conducted at oil sands sites by depositing MFT into small, shallow pits that were allowed to freeze over the winter and undergo thawing and evaporative dewatering the following summer. Scale up of such a method would require enormous surface areas and would be highly dependent on weather and season. Furthermore, other restrictions of this setup were the collection of release water and precipitation on the surface of the MFT which discounted the efficacy of the evaporative drying mechanism.

Some other known methods have attempted to treat MFT with the addition of a chemical to create a thickened paste that will solidify or eventually dewater.

One such method, referred to as "consolidated tailings" (CT), involves combining mature fine tailings with sand and gypsum. A typical consolidated tailings mixture is about 60 wt % mineral (balance is process water) with a sand to fines ratio of about 4 to 1, and 600 to 1000 ppm of gypsum. This combination can result in a non-segregating mixture when deposited into the tailings ponds for consolidation. However, the CT method has a number of drawbacks. It relies on continuous extraction operations for a supply of sand, gypsum and process water. The blend must be tightly controlled. Also, when consolidated tailings mixtures are less than 60 wt % mineral, the material segregates with a portion of the fines returned to the pond for reprocessing when settled as mature fine tailings. Furthermore, the geotechnical strength of the deposited consolidated tailings requires containment dykes and, therefore, the sand required in CT competes with sand used for dyke construction until extraction operations cease. Without sand, the CT method cannot treat mature fine tailings.

Another method conducted at lab-scale sought to dilute MFT preferably to 10 wt % solids before adding Percol LT27A or 156. Though the more diluted MFT showed faster settling rates and resulted in a thickened paste, this dilution-dependent small batch method could not achieve the required dewatering results for reclamation of mature fine tailings.

Some other methods have attempted to use polymers or other chemicals to help dewater MFT. However, these methods have encountered various problems and have been unable to achieve reliable results. When generally considering methods comprising chemical addition followed by tailings deposition for dewatering, there are a number of important factors that should not be overlooked.

Of course, one factor is the nature, properties and effects of the added chemicals. The chemicals that have shown promise up to now have been dependent on oil sand extraction by-products, effective only at lab-scale or within narrow process operating windows, or unable to properly and reliably mix, react or be transported with tailings. Some added chemicals have enabled thickening of the tailings with no change in solids content by entrapping water within the material, which limits the water recovery options from the deposited material. Some chemical additives such as gypsum and hydrated lime have generated water runoff that can adversely impact the process water reused in the extraction processes or dried tailings with a high salt content that is unsuitable for reclamation.

Another factor is the chemical addition technique. Known techniques of adding sand or chemicals often involve blending materials in a tank or thickener apparatus. Such known techniques have several disadvantages including requiring a controlled, homogeneous mixing of the additive in a stream with varying composition and flows which results in inefficiency and restricts operational flexibility. Some chemical additives also have a certain degree of fragility, changeability or reactivity that requires special care in their application.

Another factor is that many chemical additives can be very viscous and may exhibit non-Newtonian fluid behaviour. Several known techniques rely on dilution so that the combined fluid can be approximated as a Newtonian fluid with respect to mixing and hydraulic processes. Mature fine tailings, however, particularly at high mineral or clay concentrations, demonstrates non-Newtonian fluid behaviour. Consequently, even though a chemical additive may show promise as a dewatering agent in the lab or small scale batch trials, it is difficult to repeat performance in an up-scaled or commercial facility. This problem was demonstrated when attempting to inject a viscous polymer additive into a pipe carrying MFT. The main MFT pipeline was intersected by a smaller side branch pipe for injecting the polymer additive. For Newtonian fluids, one would expect this arrangement to allow high turbulence to aid mixing. However, for the two non-Newtonian fluids, the field performance with this mixing arrangement was inconsistent and inadequate. There are various reasons why such mixing arrangements encounter problems. When the additive is injected in such a way, it may have a tendency to congregate at the top or bottom of the MFT stream depending on its density relative to MFT and the injection direction relative to the flow direction. For non-Newtonian fluids, such as Bingham fluids, the fluid essentially flows as a plug down the pipe with low internal turbulence in the region of the plug. Also, when the chemical additive reacts quickly with the MFT, a thin reacted region may form on the outside of the additive plug thus separating unreacted chemical additive and unreacted MFT.

Inadequate mixing can greatly decrease the efficiency of the chemical additive and even short-circuit the entire dewatering process. Inadequate mixing also results in inefficient use of the chemical additives, some of which remain unmixed and unreacted and cannot be recovered. Known techniques have several disadvantages including the inability to achieve a controlled, reliable or adequate mixing of the chemical additive as well as poor efficiency and flexibility of the process.

Still another factor is the technique of handling the oil sand tailings after chemical addition. If oil sand tailings are not handled properly, dewatering may be decreased or altogether prevented. In some past trials, handling was not managed or controlled and resulted in unreliable dewatering performance. Some techniques such as in CIBA's Canadian patent application No. 2,512,324 (Schaffer et al.) have attempted to simply inject the chemical into the pipeline without a methodology to reliably adapt to changing oil sand tailings compositions, flow rates, hydraulic properties or the nature of particular chemical additive. Relying solely on this ignores the complex nature of mixing and treating oil sand tailings and significantly hampers the flexibility and reliability of the system. When the chemical addition and subsequent handling have been approached in such an uncontrolled, trial-and-error fashion, the dewatering performance has been unachievable.

Yet another factor is the technique of handling or treating the MFT prior to chemical addition. MFT is drawn up by pumps or dredging equipment from tailings ponds and preferably sent via pipeline to the dewatering treatment area. The tailings ponds, however, may contain a variety of materials that could disrupt the MFT dewatering process. For instance, in the raw MFT there may be mats of bitumen, particularly in the cold winter months. There may also be other extraneous debris such as pieces of wood, glass, plastic, metal or natural organic material that can be entrained with the MFT as it is taken from the pond. Such unwanted materials can interfere with the MFT process equipment and chemistry.

Given the significant inventory and ongoing production of MFT at oil sands operations, there is a need for techniques and advances that can enable MFT drying for conversion into reclaimable landscapes.

SUMMARY OF THE INVENTION

The present invention responds to the above need by providing processes for drying oil sand fine tailings.

Accordingly, embodiments of the present invention provide a process for drying oil sand fine tailings. One embodiment of the process comprises providing an in-line flow of the fine tailings; continuously introducing a flocculent solution comprising an flocculation reagent into the in-line flow of the fine tailings, to cause dispersion of the flocculent solution and commence flocculation of the fine tailings; subjecting the fine tailings to flocculation conditioning in-line to cause formation and rearrangement of flocs and increasing the yield shear stress to form an in-line flow comprising flocculated fine tailings; subjecting the flocculated fine tailings to water release conditioning to stimulate release of water while avoiding over-shearing of the flocs; and depositing the fine tailings to allow the release of water, formation of a non-flowing fine tailings deposit and drying of the non-flowing fine tailings deposit.

This process enables effective action of the flocculation reagent to occur in-line by allowing dispersion, flocculation and water release, resulting in reliable deposition and drying of the fine tailings deposit.

Also provided is a process for drying oil sand fine tailings, comprising providing an in-line flow of the fine tailings; continuously introducing a flocculent solution comprising a flocculation reagent into the in-line flow of the fine tailings by rapid mixing, to cause dispersion of the flocculent solution and commence flocculation of the fine tailings to form floes, the rapid mixing comprising: providing a mixing zone in the in-line flow of the fine tailings, the mixing zone comprising turbulence eddies which flow into a forward-flow region; continuously introducing the flocculent solution into the in-line flow such that the flocculent solution disperses within the turbulence eddies and into the forward-flow region while avoiding over-shearing the floes, to produce a flocculating mixture; inputting a sufficient energy to the flocculating mixture to cause formation and rearrangement of the floes while stimulating water release without over-shearing the floes; and allowing the fine tailings to release water and dry.

This rapid mixing enables the flocculent solution to be dispersed throughout the fine tailings in-line such that the subsequent input of energy allows improved water release and drying.

Various embodiments, features and aspects of oil sand fine tailings drying process will be further described and understood in view of the figures and description.

BRIEF DESCRIPTION OF THE DRAWINGS

FIG. 12 is a partial perspective transparent view of yet another variant of a pipeline reactor for performing embodiments of the process of the present invention.

DETAILED DESCRIPTION OF THE INVENTION

Figure 1:
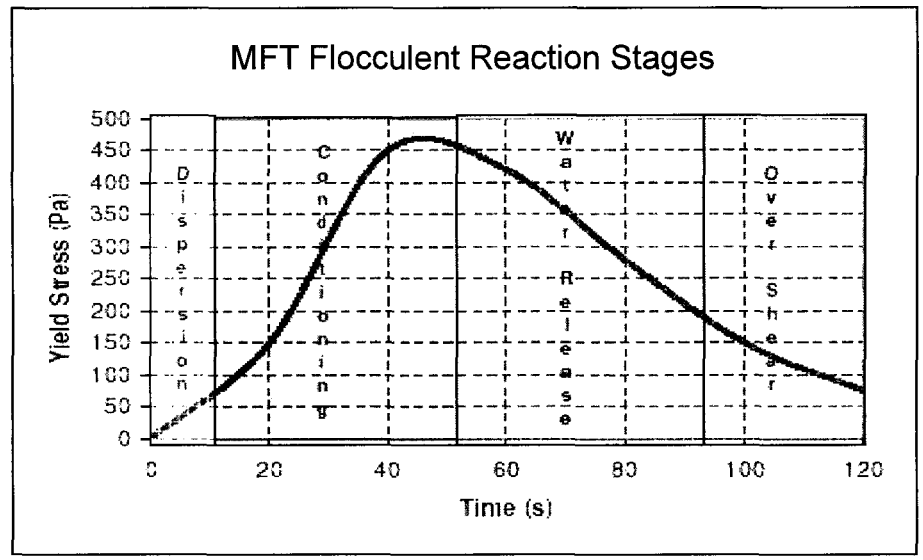
FIG. 1 is a general representative graph of shear yield stress versus time showing the process stages for an embodiment of the present invention.
Figure 2:
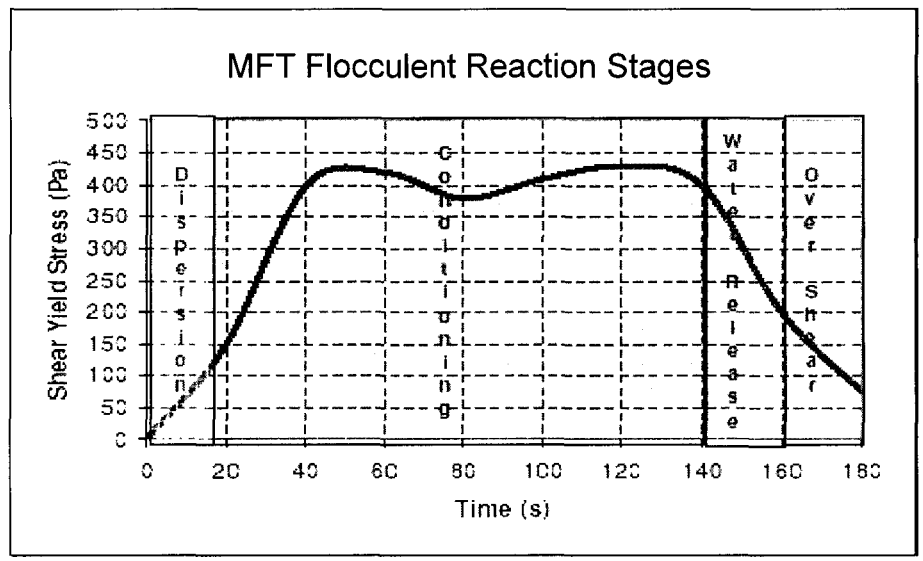
FIG. 2 is a general representative graph of shear yield stress versus time showing the process stages for another embodiment of the present invention.

Referring to FIGS. 1 and 2, the general stages of an embodiment of the process will be described. The oil sand fine tailings are treated with a flocculent solution by in-line dispersion of the flocculent solution into the fine tailings, then conditioning the fine tailings by inputting a sufficient energy to cause the formation and rearrangement of flocculated fine tailing solids to increase the yield shear strength while enabling water release without over-shearing the flocculated solid structure that can then form a non-flowing deposit. The flocculated fine tailings are deposited to allow the water release and the formation of a non-flowing deposit which is allowed to dry.

The present specification should be read in light of the following definitions:

"Oil sand fine tailings" means tailings derived from oil sands extraction operations and containing a fines fraction. They include mature fine tailings from tailings ponds and fine tailings from ongoing extraction operations that may bypass a pond, and combinations thereof. In the present description, the abbreviation MFT will be generally used, but it should be understood that the fine tailings treated according the process of the present invention are not necessarily obtained from a tailings pond.

"In-line flow" means a flow contained within a continuous fluid transportation line such as a pipe or another fluid transport structure which preferably has an enclosed tubular construction.

"Flocculent solution comprising a flocculation reagent" means a solution comprising a solvent and at least one flocculation reagent. The flocculent solution may contain a combination of different flocculation reagents, and may also include additional chemicals. The solvent comprises water but may include other compounds as well, as desired. Flocculation reagents are compounds that have structures which form a bridge between particles, uniting the particles into random, three-dimensional porous structures called "flocs". Thus, the flocculation reagents do not include chemicals that merely act electrostatically by reducing the repulsive potential of the electrical double layer within the colloid. The flocculation reagents have structures for forming floc arrangements upon dispersion within the MFT, the flocs being capable of rearranging and releasing water when subjected to a specific window of conditioning. The preferred flocculation reagents may be selected according to given process conditions and MFT composition.

"Molecular weight" means the average molecular weight determined by measurement means known in the art.

"Dispersion", as relates to the flocculent solution being introduced into the in-line flow of MFT, means that upon introduction within the MFT the flocculent solution transitions from droplets to a dispersed state sufficient to avoid under-reacting or over-reacting in a localized part of the MFT which would impede completion of the flocculation in the subsequent conditioning stage to reliably enable dewatering and drying.

"Flocculation conditioning" is performed in-line and involves the flocculation reagent reacting with the MFT solids to form flocs and through rearrangement reactions increase the strength of the flocculating MFT.

"Water release conditioning" means that energy is input into the flocculated MFT so as to initiate rearrangement and breakdown of the structure to release water from the flocculated matrix. The energy input may be performed by in-line shearing or by other means. "Release of water" in this context means that water selectively separates out of the flocculated MFT matrix while leaving the flocs sufficiently intact for deposition.

"Over-shearing", which is a stage that defines the limit of the water release conditioning stage and is to be avoided, means that additional energy has been input into the flocculated MFT resulting in dispersing the structure and resuspending the fines within the water. Over-sheared MFT releases and resuspends fines and ultrafines entrapped by the flocs back into the water, essentially returning to its original fluid properties but containing non-functional reagent.

"Non-flowing fine tailings deposit" means a deposited flocculated MFT that has not been over-sheared and has sufficient strength to stand while drying. While the water release from the flocs is triggered by conditioning, the MFT deposit may have parts that continue to release water after it has been deposited. The drying of the MFT deposit may then occur by gravity drainage, evaporation and permeation. The removal of water from the flocculated MFT may also occur before deposition, for instance when a stream of release water separates from the flocculated MFT upon expelling for deposition.

"Yield shear strength" means the shear stress or pressure required to cause the MFT to flow.

In one embodiment of the process of the present invention, the oil sand fine tailings are primarily MFT obtained from tailings ponds given the significant quantities of such material to reclaim. The raw MFT may be pre-treated depending on the downstream processing conditions. For instance, oversized materials may be removed from the raw MFT. In addition, specific components of the raw MFT may be selectively removed depending on the flocculation reagent to be used. For instance, when a cationic flocculation reagent is used, the raw MFT may be treated to reduce the residual bitumen content which could cause flocculent deactivation. The raw MFT may also be pre-treated to provide certain solids content or fines content of the MFT for treatment or hydraulic properties of the MFT. More regarding possible pre-treatments of the raw MFT will be understood in light of descriptions of the process steps herein below. The fine tailings may also be obtained from ongoing oil sand extraction operations. The MFT may be supplied from a pipeline or a dedicated pumped supply.

In one embodiment, the process is conducted in a "pipeline reactor" followed by deposition onto a deposition area. The pipeline reactor may have various configurations, some of which will be described in detail herein below.

Figure 3:
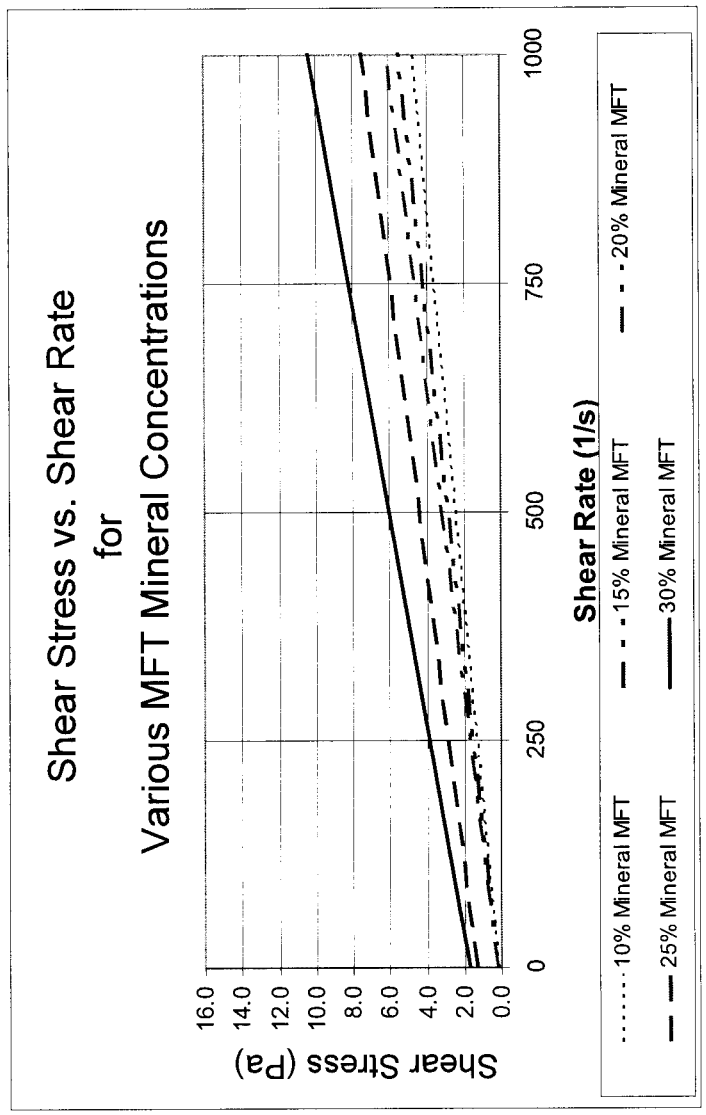
FIG. 3 is a graph showing the relationship between shear stress and shear rate for an MFT sample, illustrating the non-Newtonian nature of MFT at higher solids contents.

The MFT to be treated is provided as an in-line flow in an upstream part of the pipeline reactor. The properties of the MFT and its particular flow characteristics will significantly depend on its composition. At low mineral concentrations the yield stress to set the MFT fluid in motion is small and hydraulic analysis can approximate the fluid behaviour of a Newtonian fluid. However, as mineral concentration increases a yield stress must be overcome to initiate flow. These types of fluids are a class of non-Newtonian fluids that are generally fitted by models such as Bingham fluid, Herschel-Bulkley yield-power law or Casson fluid. The rheological relationship presented in FIG. 3, illustrating a yield stress response to shear rate for various mineral concentrations in a MFT sample, considers MFT as a Bingham fluid. MFT may also be modelled in viscometric studies as a Herschel-Bulkley fluid or a Casson Fluid.

Empirical data and modelling the rheology of in-line MFT have confirmed that when a flocculent solution is added by conventional side injection into a Bingham fluid MFT, solution dispersion is very sensitive to flow rate and diameter ratios as well as fluid properties.

In one aspect of the process, particularly when the flocculent solution is formulated to behave as a non-Newtonian fluid, the dispersion stage is performed to cause rapid mixing between two non-Newtonian fluids. Rapid non-Newtonian mixing may be achieved by providing a mixing zone which has turbulence eddies which flow into a forward-flow region and introducing the flocculent solution such that the turbulence eddies mix it into the forward-flow region. Preferably, the flocculent solution is introduced into the turbulence eddies and then mixes into the forward-flow region.

Figure 4:
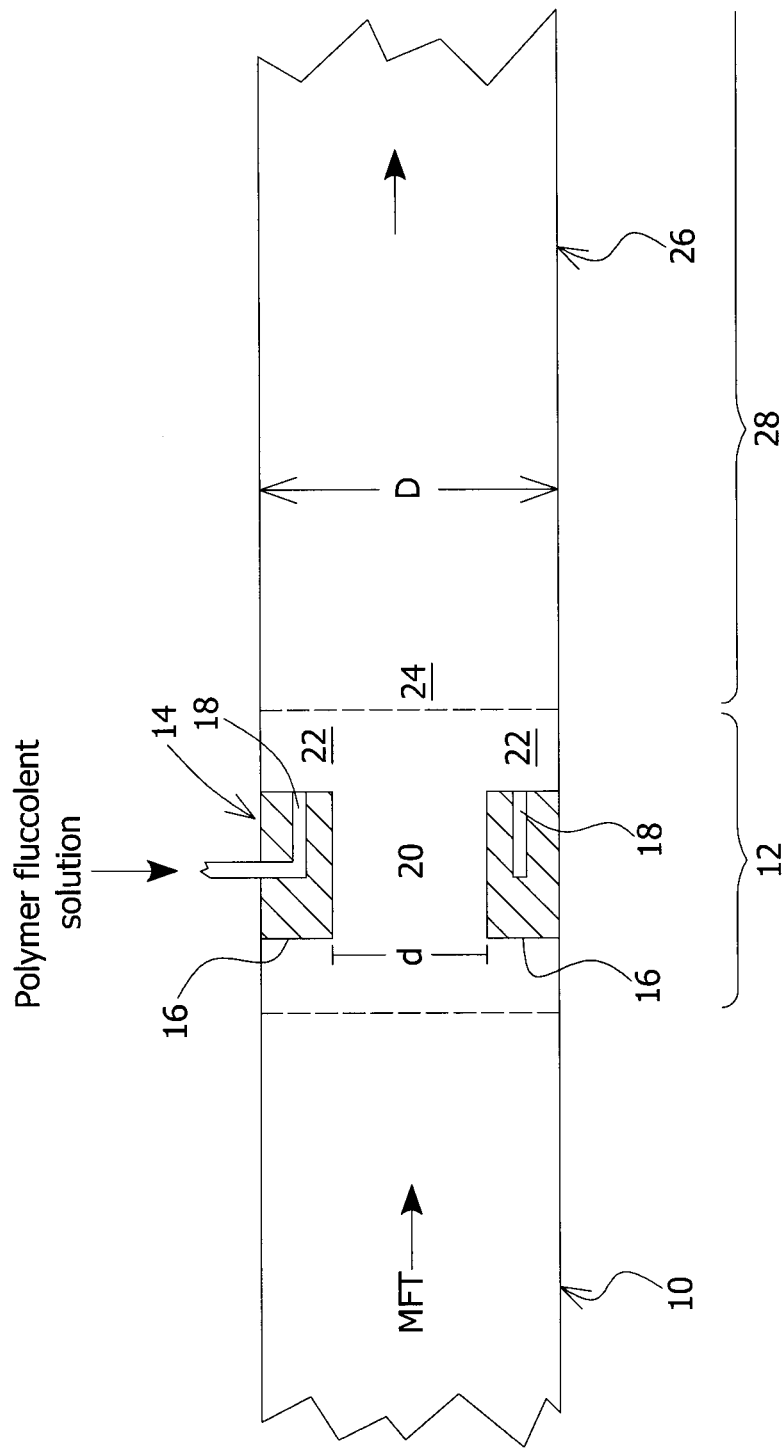
FIG. 4 is a side cross-sectional view of a pipeline reactor for performing embodiments of the process of the present invention.
Figure 5:
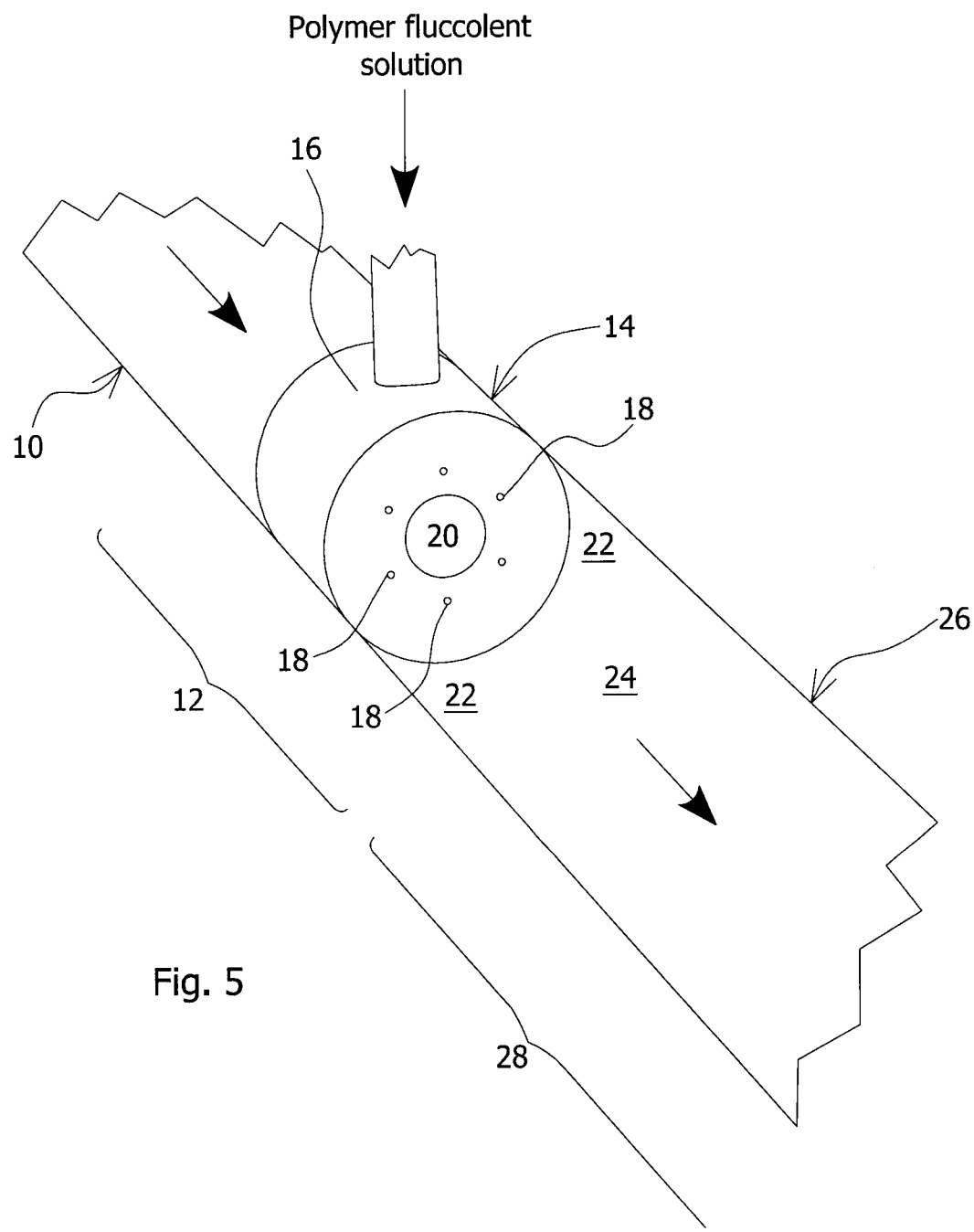
FIG. 5 is a partial perspective transparent view of a pipeline reactor for performing embodiments of the process of the present invention.

FIGS. 4 and 5 illustrate a pipeline reactor design that enables such rapid mixing of non-Newtonian fluids. The MFT is supplied from an upstream pipeline 10 into a mixing zone 12. The mixing zone 12 comprises an injection device 14 for injecting the flocculent solution. The injection device may also be referred to as a "mixer". The injection device 14 may comprise an annular plate 16, injectors 18 distributed around the annular plate 16 and a central orifice 20 defined within the annular plate 16. The MFT accelerates through the central orifice 20 and forms a forward-flow region 24 and an annular eddy region 22 made up of turbulence eddies. The injectors 18 introduce the flocculent solution directly into the eddy region 22 for mixing with the turbulent MFT. The recirculation of the MFT eddies back towards the orifice 20 results in mixing of the flocculent solution into the MFT forward-flow. The forward-flow region 24 expands as it continues along the downstream pipe 26. For some mixer embodiments, the forward-flow region may be a vena-contra region of a jet stream created by an orifice or baffle. The main flow of the MFT thus draws in and mixes with the flocculent solution, causing dispersion of the flocculent solution, and flocculation thus commences in a short distance of pipe. The injection device 14 illustrated in FIGS. 4 and 5 may also be referred to as an "orifice mixer". For the mixer of FIGS. 4 and 5, the preferred range of orifice diameter "d" to downstream pipe diameter "D" is 0.25-0.75.

Figure 6:
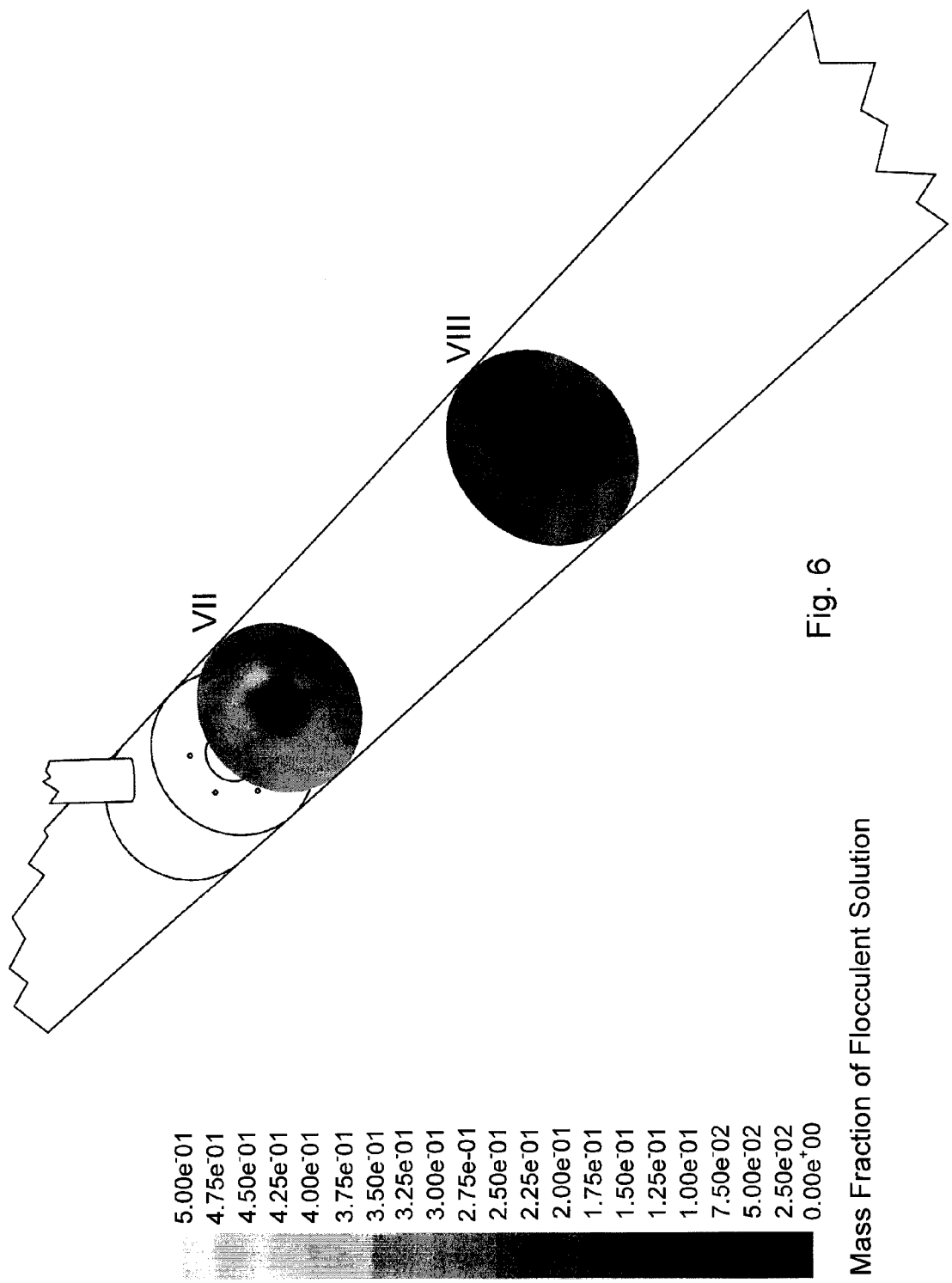
FIG. 6 is a partial perspective transparent view of the pipeline reactor of FIG. 5 with cross-sections representing the relative concentration of flocculent solution and MFT at two different distances from the injection location.
Figure 7:
FIG. 7 is a close-up view of section VII of FIG. 6.
Figure 8:
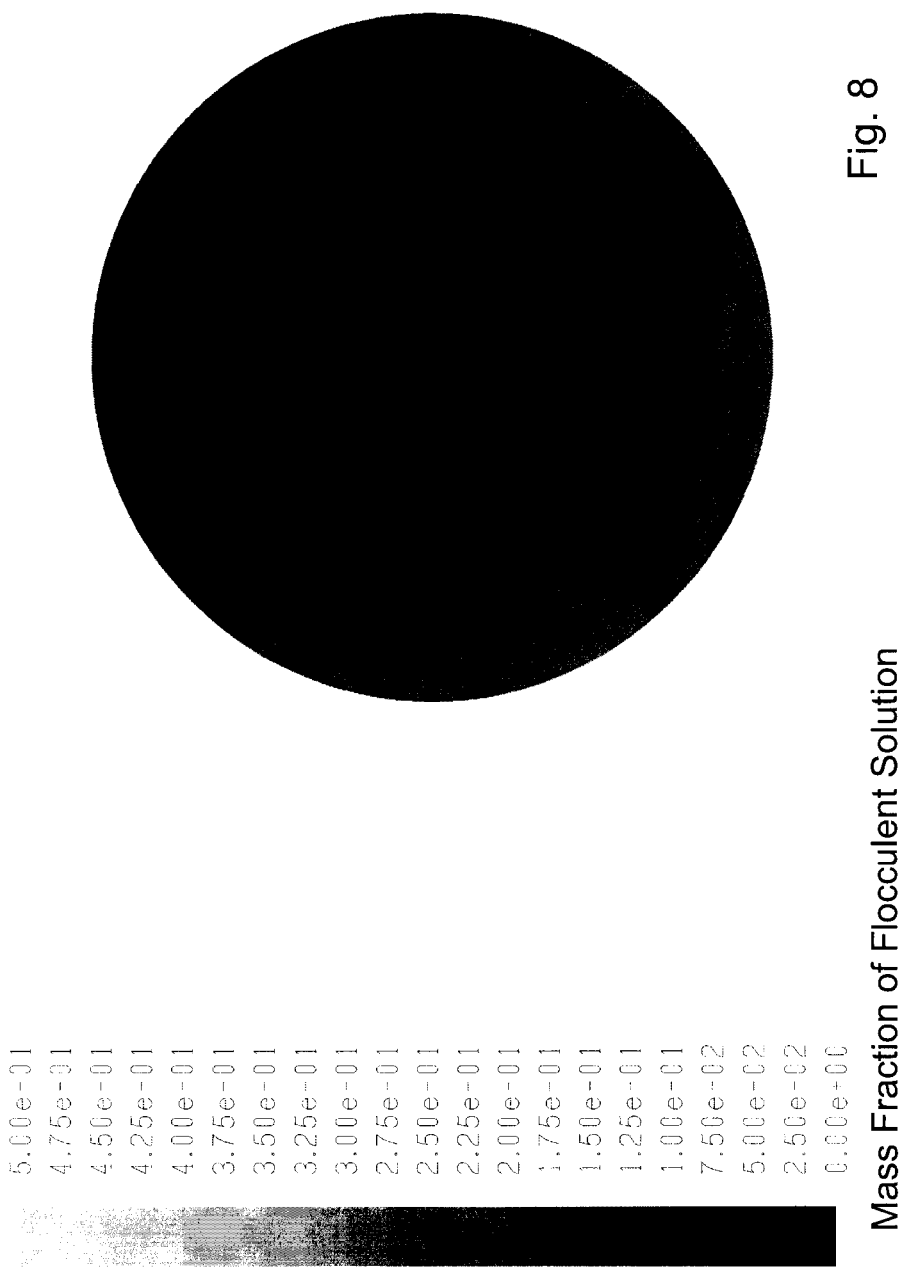
FIG. 8 is a close-up view of section VIII of FIG. 6.

FIGS. 6-8 illustrate the performance of an orifice mixer based on computational fluid dynamic (CFD) modeling and empirical data obtained from a test installation on a MFT pipeline reactor. The MFT flow rate in a 2 inch diameter pipe was 30 LPM and flocculent solution was injected at about 3 LPM. The 2 inch long orifice mixer had an orifice to downstream pipe diameter ratio d/D=0.32 with six 0.052 inch diameter injectors located on a 1.032 inch diameter pitch circle. Due to the density difference between the MFT and flocculent solution, a useful method of characterizing the degree of mixing is to determine the second moment M of the concentration C over the pipe cross section A in the following equation where $\bar{C}$ is the mean concentration for the fully mixed case (thus directionally M=0 is desired).

$$M = \frac{1}{A}\int_A \left(\frac{C}{\overline{C}} - 1\right)^2 dA$$

In FIGS. 6-8, the dark areas represent MFT that has not mixed with the flocculent solution (referred to hereafter as "unmixed MFT"). Just downstream of the mixer, the unmixed MFT region is limited to the central core of the pipe and is surrounded by various flocculent solution-MFT mixtures indicative of local turbulence in this zone. As the flocculent solution is miscible in MFT, the jetting of the flocculent solution into the turbulent zone downstream may cause the flocculent solution to first shears the continuous phase into drops from which diffusion mixing disperses the flocculent into the MFT.

The CFD model was based on a Power-law-fluid for the flocculent solution and a Bingham-fluid for the MFT without reactions. The Bingham-fluid approximation takes into account the non-Newtonian nature of the MFT as requiring a yield stress to initiate flow. Bingham-fluids are also time-independent, having a shear stress independent of time or duration of shear. Preferably, the CFD model is primarily used to determine and improve initial mixing between the flocculent solution and the MFT.

Figure 9:
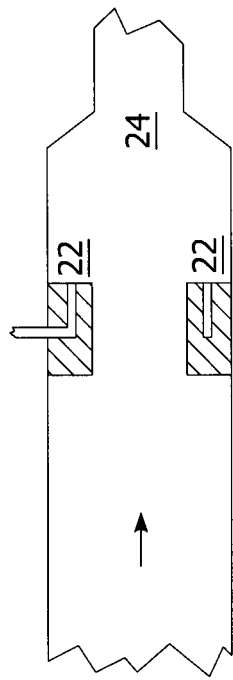
FIG. 9 is a side cross-sectional view of a variant of a pipeline reactor for performing embodiments of the process of the present invention.
Figure 11:
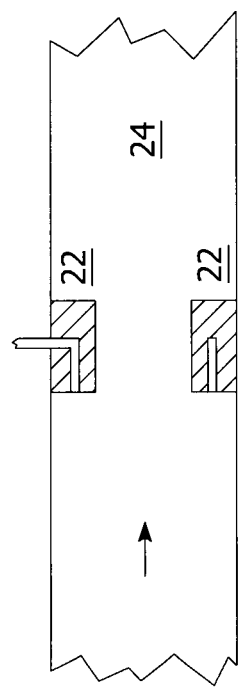
FIG. 11 is a side cross-sectional view of another variant of a pipeline reactor for performing embodiments of the process of the present invention.
Figure 10:
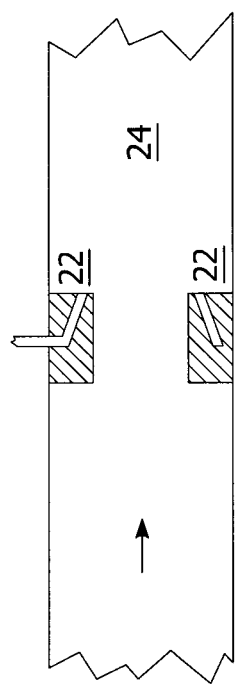
FIG. 10 is a side cross-sectional view of another variant of a pipeline reactor for performing embodiments of the process of the present invention.

The injection device 14 may have a number of other arrangements within the pipeline reactor and may include various elements such as baffles (not shown). In one optional aspect of the injection device shown in FIG. 9, at least some of the injectors are oriented at an inward angle such that the flocculent solution mixes via the turbulence eddies and also jet toward the core of the MFT flow. In another aspect shown in FIG. 10, the orifice has a reduced diameter and the injectors may be located closer to the orifice than the pipe walls. The injectors of the mixer may also be located at different radial distances from the centre of the pipeline. In another aspect, instead of an annular plate with a central orifice, the device may comprise baffles or plates having one or multiple openings to allow the MFT to flow through the mixing zone while creating turbulence eddies. In another aspect shown in FIG. 11, the injectors face against the direction of MFT flow for counter-current injection. FIG. 12 illustrates another design of injection device that may be operated in connection with the process of the present invention. It should also be noted that the injection device may comprise more than one injector provided in series along the flow direction of the pipeline. For instance, there may be an upstream injector and a downstream injector having an arrangement and spacing sufficient to cause the mixing. In a preferred aspect of the mixing, the mixing system allows the break-up of the plug flow behaviour of the Bingham fluid, by means of an orifice or opposing "T" mixer with MFT and flocculent solution entering each arm of the Tee and existing down the trunk. Density differentials (MFT density depends on concentration ~30 wt % corresponds to a specific gravity of ~1.22 and the density of the flocculent solution may be about 1.00) together with orientation of the injection nozzles play a role here and are arranged to allow the turbulence eddies to mix in and disperse the flocculent solution.

The following table compares the second moment values for the orifice mixer (FIG. 4) and a quill mixer (FIG. 12) at various locations downstream of the injection location for the same flows of MFT and flocculent reagent solution.

| Downstream Distance | M | |
|---|---|---|
| L/D | Orifice Mixer (FIG. 4) | Quill Mixer (FIG. 12) |
| 1 | 11.75 | 5.75 |
| 2 | 3.17 | 3.65 |
| 3 | 1.75 | 2.89 |
| 5 | 1.10 | 2.24 |
| 10 | 0.65 | 1.39 |

Near to the injection point of the orifice mixer as shown on FIG. 7, there is a larger region of unmixed polymer surrounding a strong MFT jet with a "M" value of 11.75, However, the mixing with the MFT jet occurs very rapidly so that by 5 diameters downstream of the injection point shown as FIG. 8 with a second moment M value of 1.10. In contrast, for the quill mixer as shown FIG. 12, the initial mixing with a second moment M value of 5.75 only improves to 2.24 by 5 diameters downstream of the injection point. Mixing by the orifice mixer is preferred to the quill mixer.

Preferably, the mixing is sufficient to achieve an M<2 at L/D=5, and still preferably the mixing is sufficient to achieve an M<1.5 at L/D=5, for the pipeline reactor. Controlling the mixing at such preferred levels allows improved dispersion, flocculation and dewatering performance.

Initial mixing of the flocculent solution into the MFT is important for the flocculation reactions. Upon its introduction, the flocculent solution is initially rapidly mixed with the fine tailings to enhance and ensure the flocculation reaction throughout the downstream pipeline. When the flocculent solution contacts the MFT, it starts to react to form flocs made up of many chain structures and MFT minerals. If the flocculent solution is not sufficiently mixed upon introduction into the pipe, the flocculation reaction may only develop in a small region of the in-line flow of tailings. Consequently, if the tailings are subsequently mixed downstream of the polymer injection, mixing will be more difficult since the rheology of the tailings will have changed. In addition, the flocs that formed initially in the small region can be irreversibly broken down if subsequent mixing imparts too much shear to the flocs. Over-shearing the flocs results in resuspending the fines in the water, reforming the colloidal mixture, and thus prevents water release and drying. Thus, if adequate mixing does not occur upon introduction of the flocculent solution, subsequent mixing becomes problematic since one must balance the requirement of higher mixing energy for flocculated tailings with the requirement of avoiding floc breakdown from over-shearing.

The initial mixing may be achieved and improved by a number of optional aspects of the process. In one aspect, the injection device is designed and operated to provide turbulence eddies that mix and disperse the flocculent solution into the forward flow of MFT. In another aspect, the flocculation reagent is chosen to allow the flocculent solution to have decreased viscosity allowing for easier dispersion. The flocculent solution may also be formulated and dosed into the MFT to facilitate dispersion into the MFT. Preferably, the flocculation reagent is chosen and dosed in conjunction with the injection conditions of the mixer, such that the flocculent solution contains sufficient quantity of reagent needed to react with the MFT and has hydraulic properties to facilitate the dispersion via the mixer design. For instance, when a viscous flocculent solution displaying plastic or pseudo-plastic non-Newtonian behaviour is used, the mixer may be operated at high shear injection conditions to reduce the viscosity sufficiently to allow dispersion into the MFT at the given hydraulic mixing conditions. In yet another aspect, the flocculation reagent is chosen to form flocs having increased shear resistance. Increased shear resistance enables more aggressive, harsh mixing and reduces the chance of premature over-shearing of the resulting flocs. The increased shear resistance may be achieved by providing the flocculent with certain charge characteristics, chain lengths, functional groups, or inter- or intra-linking structures. In another aspect, the flocculation reagent is chosen to comprise functional groups facilitating rearrangement and selective water release. In another aspect, the flocculation reagent is chosen to form large flocs facilitating rearrangement and partial breakdown of the large flocs for water release. In another aspect, the flocculation reagent may be an organic polymer flocculent. The polymer flocculent may have a high molecular weight, such as above 10,000,000, or a low molecular weight. The high molecular weight polymers may tend to form more shear resistant flocs yet result in more viscous flocculent solutions at the desired dosages. Thus, such flocculent solutions may be subjected to higher shear injection to reduce the viscosity and the turbulence eddies may be given size and spacing sufficient to disperse the flocculent solution within the pipeline mixing zone.

In another aspect, the flocculation reagent may be chosen and dosed in response to the clay concentration in the MFT. The flocculation reagent may be anionic, cationic, non-ionic, and may have varied molecular weight and structure, depending on the MFT composition and the hydraulic parameters.

It should be noted that, contrary to conventional teachings in the field of MFT solidification and reclamation, the improvement and predictability of the drying process rely more in the process steps than in the specific flocculation reagent selected. Of course, some flocculation reagents will be superior to others at commercial scale, depending on many factors. However, the process of the present invention enables a wide variety of flocculation reagents to be used, by proper mixing and conditioning in accordance with the process steps. By way of example, the flocculent reagent may be an organic polymer flocculent. They may be polyethylene oxides, polyacrylamides, anionic polymers, polyelectrolytes, starch, co-polymers that may be polyacrylamide-polyacrylate based, or another type of organic polymer flocculents. The organic polymer flocculents may be obtained from a flocculent provider and subjected to selection to determine their suitability to the specific commercial application.

Figure 13:
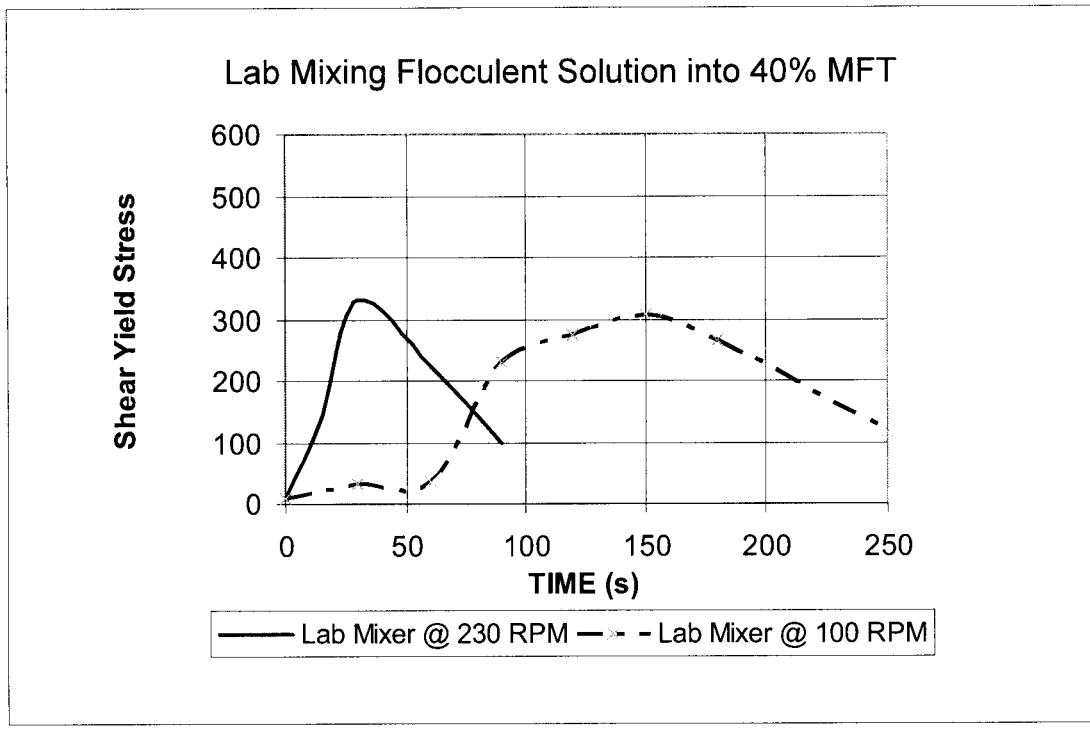
FIG. 13 is a graph of shear yield stress versus time comparing different mixing speeds in a stirred tank for mature fine tailings treated with flocculent solution.

Initial mixing was further assessed in a conventional stirred mix tank by varying the initial speed of the mixer. FIG. 13 presents indicative lab test results comparing rapid mixing (230 RPM) and slow mixing (100 RPM). The test results with the mixer at the higher initial speed developed flocculated MFT with a higher shear yield strength significantly faster than tests with the mixer at a lower speed. For the lower speed, the time delay was attributable to dispersing the flocculent solution into the MFT. Moreover, FIG. 14 indicates that the fast initial mixing also resulted in higher initial water release rates, which results in reduced drying times.

While the lab scale stirred tank demonstrated benefits from fast mixing, other results also demonstrated the effect of over-mixing or over-shearing, which would break down the flocculated MFT such that the MFT would not dewater. The lab scale stirred tank is essentially a batch back-flow reactor in which the mixer imparts shear firstly to mix the materials and secondly to maintain the flocculating particles in suspension while the reactions proceed to completion. As the operational parameters can be easily adjusted, the stirred tank provides a valuable tool to assess possible flocculation reagent performance. Lab scale stirred tank data may be advantageously coupled with lab pipeline reactor tests and CFD modelling for selecting particular operating parameters and flocculation reagents for embodiments of the continuous in-line process of the present invention.

The MFT supplied to the pipeline reactor may be instrumented with a continuous flow meter, a continuous density meter and means to control the MFT flow by any standard instrumentation method. An algorithm from the density meter may compute the mineral concentration in MFT and as an input to the flow meter determine the mass flow of mineral into the pipeline reactor. Comparing this operating data to performance data for the pipeline reactor developed from specific flocculation reagent properties, specific MFT properties and the specific pipeline reactor configurations, enables the adjustment of the flowrate to improve processing conditions for MFT drying. Operations with the mixer in a 12 inch pipe line processing 2000 USgpm of MFT at 40% solids dewatered MFT with a pipe length of 90 meters.

Referring back to FIGS. 4 and 5, after introduction of the flocculation reagent in the mixing zone 12, the flocculating MFT continues into a conditioning zone 28. The conditioning stage of the process will be generally described as comprising two main parts: flocculation conditioning and water release conditioning.

At this juncture, it is also noted that for Newtonian fluid systems, research into flocculated systems has developed some tools and relationships to help predict and design processes. For instance, one relationship that has been developed that applies to some flocculated systems is a dimensionless number called the "Camp number". The Camp number relates power input in terms of mass flow and friction to the volume and fluid absolute viscosity. In non-Newtonian systems such as MFT-polymer mixing both pipe friction and the absolute viscosity terms used in the Camp number depend on the specific flow regime. The initial assessment of the pipeline conditioning data implies the energy input may be related to modified Camp number. The modified Camp number would consider the flocculating agent, the rheology of the flocculated MFT in addition to the flow and friction factors.

Flocculation conditioning occurs in-line to cause formation and rearrangement of flocs and increases the yield shear stress of the MFT. Referring to FIGS. 4 and 5, once the MFT has gone through the mixing zone 12, it passes directly to the flocculation conditioning zone 28 of the pipeline reactor. The flocculation conditioning zone 28 is generally a downstream pipe 26 with a specific internal diameter that provides wall shear to the MFT. In one aspect of the process, the flocculation conditioning increases the yield shear stress to an upper limit. The upper limit may be a single maximum as shown in FIG. 1 or an undulating plateau with multiple local maximums over time as shown in FIG. 2. The shape of the curve may be considered a primary function of the flocculent solution with secondary functions due to dispersion and energy input to the pipeline, such as via baffles and the like.

Water release conditioning preferably occurs in-line after the flocculation conditioning. Referring to FIGS. 1 and 2, after reaching the yield shear upper limit, additional energy input causes the yield stress to decrease which is accompanied by a release of water from the flocculated MFT matrix. Preferably, the water release conditioning occurs in-line in a continuous manner following the flocculation conditioning and before deposition. In this case, the water release may commence in-line resulting in a stream of water being expelled from the outlet of the pipe along with depositing flocculated MFT. The release water will quickly flow away from the MFT deposit, especially on a sloped deposition area, while the MFT deposit has sufficient strength to stand on the deposition area. Here, it is preferred to have no high-shear units such as pumps in the downstream pipe. The hydraulic pressure at the MFT pipeline reactor inlet is preferably established so that no additional pumping which may over-shear the flocs would be required to overcome both static and differential line head losses prior to deposition. It is also preferred not to disturb the deposited MFT with further shearing, but rather to let the MFT deposit dry after in place, upon deposition. Alternatively, instead of being performed in-line, the water release conditioning may occur in a controlled shearing apparatus (not shown) comprising baffles, an agitator, a mixer, or a rotary separator, or a combination thereof. The water release conditioning may also occur after the flocculated MFT is deposited, for instance by a mechanical mechanism in an ordered fashion. In such a case, the flocculated MFT would be deposited as a gel-like mass at a shear yield strength allowing it to stand but tending not to promote water release until additional energy input is applied. By conditioning the flocculated MFT back down from a yield stress upper threshold, the process avoids the formation of a gel-like water-retaining deposit, reliably enabling water release and accelerated drying of the MFT.

Care should also be taken not to expel the MFT from a height that would accelerate it to over shear due to the impact on the deposition area or the previously deposited MFT.

Figure 15:
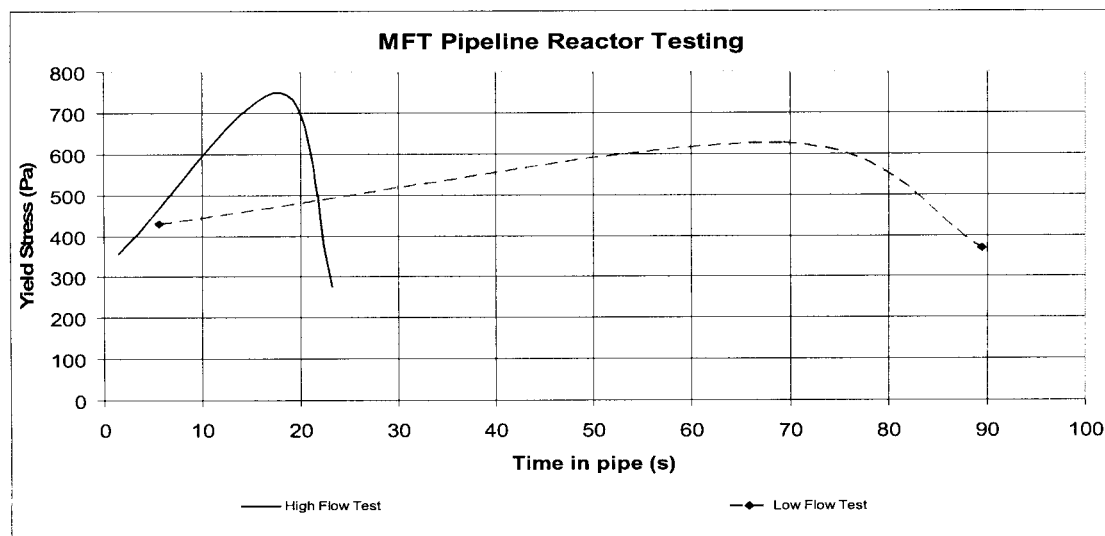
FIG. 15 is a graph of yield shear stress versus time in a pipe for different pipe flow rates for mature fine tailings treated with flocculent solution.

The flocculation conditioning and the water release conditioning may be controlled in-line by varying the flow rate of the MFT. Preferably, the flow rate may be as high as possible to increase the yield stress evolution rate of the flocculating MFT, while avoiding over-shear based on the hydraulic shear of the pipeline to the deposition area. Tests were conducted in a pipeline reactor to determine conditioning response. FIG. 15 identifies the response to varying the pipeline flow rate. A 34 wt % solids MFT was pumped through a 2 inch diameter pipe at a flow rate of about 26 LPM for the low flow test and about 100 LPM for the high flow test. A 0.45% flocculent solution was injected at about 2.6 LPM for the low flow test and at about 10 LPM for the high flow test. At high flows, the maximum yield shear stress of the flocculated MFT occurs earlier than at low flows. This observed response indicates that the total energy input is an important parameter with input energy being hydraulic losses due the fluid interacting with the pipe wall in this case.

Referring to FIGS. 4 and 5, the conditioning zone 28 may include baffles, orifice plates, inline static mixers or reduced pipe diameter (not shown) particularly in situations where layout may constrain the length of the pipeline reactor, subject to limiting the energy input so the flocculated MFT is not over sheared. If the flocculated MFT is over sheared, the flocs additionally break down and the mineral solids revert back to the original colloidal MFT fluid which will not dewater.

In one preferred embodiment of the process, when the yield stress of the flocculated MFT at release is lower than 200 Pa, the strength of the flocculated MFT is inadequate for dewatering or reclamation of the deposited MFT. Thus, the yield shear stress of the flocculated MFT should be kept above this threshold. It should be understood, however, that other flocculation reagents may enable a flocculated MFT to dewater and be reclaimed at a lower yield stress. Thus, although FIGS. 1 and 2 show that a yield stress below 200 Pa is in the over-shearing zone, these representative figures do not limit the process to this specific value. When an embodiment of the process used 20%-30% charge anionic polyacrylamide high molecular weight polymers, the lower threshold of the yield shear stress window was about 200 Pa, and the flocculated MFT was deposited preferably in the range of about 300 Pa and 500 Pa, depending on the mixing and MFT solids content.

It should also be noted that the yield shear stress has been observed to reach upper limits of about 400-800 Pa in the pipeline reactor. It should also be noted the yield shear stress of the MFT after the initial water is released when the MFT is deposited has been observed to exceed 1000 Pa.

In general, the process stage responses for a given flocculation reagent and MFT are influenced by flocculent type, flocculent solution hydraulic properties, MFT properties including concentration, particle size distribution, mineralogy and rheology, dosing levels and energy input.

The process provides the advantageous ability to predict and optimize the performance of a given flocculent reagent and solution for dewatering MFT. The mixing zone ensures the efficient use of the flocculation reagent and the pipeline conditions of length, flow rate and baffles if required provide the shear necessary to maximize water release and avoid over-shearing when the MFT is discharged from the pipeline reactor.

In one embodiment of the process, after the in-line water release conditioning, the flocculated MFT is deposited to form a non-flowing MFT deposit. The conditioned MFT is suitable for direct deposition on a deposition area, where water is released from the solids, drained by gravity and further removed by evaporation to the air and optionally permeates into the deposition area. The deposition area may comprise sand surfaces to facilitate draining and permeation. The MFT deposit dries so as to reach a stable concentration of the MFT solids for reclamation purposes. In other alternative embodiments for dewatering flocculated MFT, solid-liquid separation equipment may be used provided the shear imposed does not over-shear the flocculated MFT. The MFT pipeline reactor may be used to treat MFT or other tailings or colloidal fluids having non-Newtonian fluid behaviour for deposition or for other dewatering devices such as filters, thickeners, centrifuges and cyclones.

In one aspect of the process, the MFT is continuously provided from a pond and has a solids content over 20 wt %, preferably within 30-40 wt %. The MFT is preferably undiluted. After the flocculent solution is dispersed into the MFT, the flocculated MFT releases water thus allows in-line separation of the water from the flocculated MFT.

Embodiments and aspects of the present invention will be further understood and described in light of the following examples.

EXAMPLES

Example 1

Figure 14:
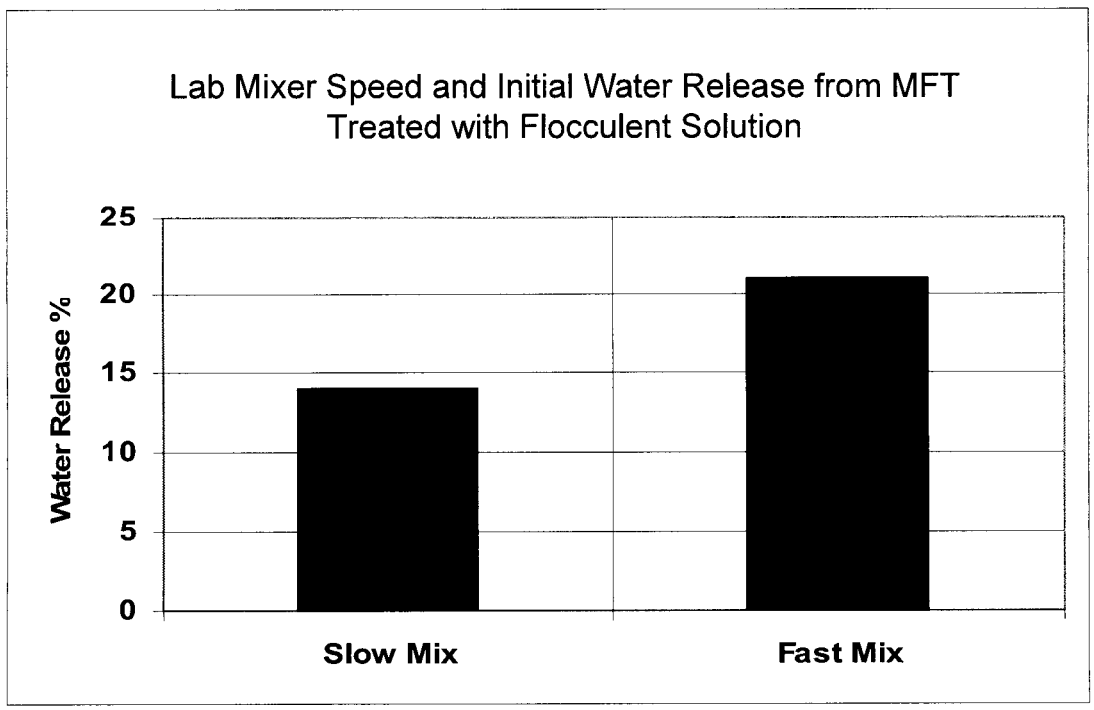
FIG. 14 is a bar graph of water release percentage versus mixing speeds for mature fine tailings treated with flocculent solution.

As mentioned in the above description, lab scale stirred tank tests were conducted to assess mixing of a flocculent solution into MFT. The lab mixer was run at initial speeds of 100 RPM or 230 RPM. The dosage of 30% charge anionic polyacrylamide-polyacrylate shear resistant co-polymer was about 1000 g per dry ton. FIGS. 13 and 14 show that the fast initial mixing shortens the yield stress evolution to enable dewatering and also increases the water release from the MFT.

Example 2

As mentioned in the above description, lab scale stirred tank tests were conducted to assess mixing of different dosages of flocculent solution into MFT. The lab mixer was run at speeds of 100 RPM or 230 RPM for flocculent solutions containing different doses of dissolved flocculation reagent.

The dosages of flocculent ranging from 800 to 1200 g per dry tonne of MFT indicated adequate mixing and flocculation for dewatering. The flocculation reagent here was a 30% charge anionic polyacrylamide-polyacrylate shear resistant co-polymer with a molecular weight over 10,000,000. A dosage range of 1000 g per dry tonne ±20% was appropriate for various 30% charge polyacrylamides for MFT with clay content of 50 to 75%.

Example 3

As mentioned in the above description, continuous flow pipeline reactor tests were conducted. Results are shown in FIG. 15 comparing high and low flow rates. A 34 wt % solids MFT was pumped through a 2 inch diameter pipe at a flow rate of 26 LPM for the low flow test and 100 LPM for the high flow test. A 0.45% organic polymer flocculent solution was injected at 2.6 LPM for the low flow test and at 10 LPM for the high flow test. The distance from injection to deposition was 753 inches or 376.5 pipe diameters. The 2 inch long orifice mixer had an orifice to downstream pipe diameter ratio d/D=0.32 with six 0.052 inch diameter injectors located on a 1.032 inch diameter pitch circle. For the high flow test the six injector diameters were increased to 0.100 inch.

Example 4

As mentioned in the above description, computational fluid dynamic (CFD) modelling was conducted. The CFD modelling considered the flocculent solution as a Power-law-fluid and the MFT as a Bingham-fluid in the mixing zone and confirmed both the adequate mixing of the injection device of FIGS. 4 and 5 and the inadequate mixing of the conventional side branch tube as discussed in the Background section under the same conditions. The MFT flow rate in a 2 inch diameter pipe was 30 LPM and polymer solution was injected at 3 LPM. The 2 inch long orifice mixer had an orifice to downstream pipe diameter ratio d/D=0.32 with six 0.052 inch diameter injectors located on a 1.032 inch diameter pitch circle. The MFT had a density of 1250 kg/m$^3$ and a yield stress of 2 Pa while the polymer solution had a density of 1000 kg/m$^3$, with a power-law index n=0.267 and a consistency index of 2750 kg s$^{n-2}$/m.

Furthermore, the visualization shown in FIGS. 6-8 is only possible by CFD modelling due to the opaqueness of actual MFT. For MFT, the CFD model incorporates non-Newtonian fluid behaviours into the hydraulic analysis to develop a robust design for a variety of possible combinations and permutations between various MFT properties and flocculation reagent solutions.

Example 5

As described above, the present invention resides in the process steps rather than in the specific flocculation reagent selected. A person skilled in the art may select a variety of flocculation reagents that enable in-line dispersion, flocculation, water release and non-flowing deposition. One selection guideline method includes taking an MFT sample representative of the commercial application and using a fast-slow mixer test to observe the water release capability of the flocculent. In the fast-slow mixer test, the flocculent is injected into the mixer running at a fast mixing rate and after a delay of 7 seconds the mixer is switched to slow mixing. Water release may then be assessed. For instance, test have been run at 230 RPM (corresponding to a shear rate of 131.5 s$^{-1}$) for fast mixing and 100 RPM (corresponding to a shear rate of 37. s$^{-1}$) for slow mixing. A fast-slow mixer test was conducted on 10%, 20%, 30% and 40% charge anionic polyacrylamide flocculants and the 30% charge anionic polyacrylamides enabled superior water release. The use of such 30% charge anionic polyacrylamides in the pipeline reactor and CFD modeling validated this approach. In addition, the fast-slow mixer test was conducted on high and low molecular weight linear anionic polyacrylamide flocculents and the high molecular weight polyacrylamides enabled superior water release. The fast-slow mixer test may be combined with the CFD model to test the mixing of the flocculent solution at the density of the desired formulation. Such cross-validation of flocculation reagents and solutions helps improve the process operating conditions and validate preferred flocculation reagents and solutions.

Example 6

Figure 16:
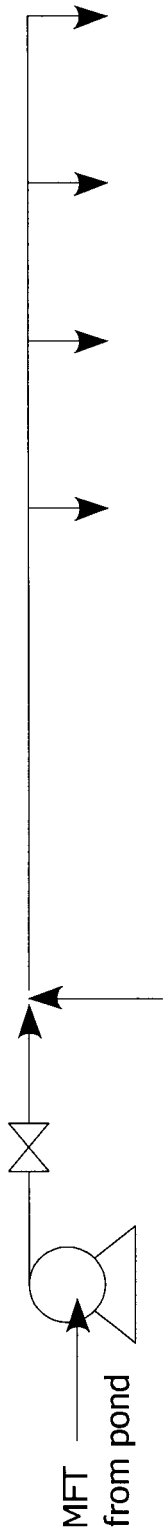
FIG. 16 is a schematic representation of treating mature fine tailings with a flocculent solution.
Figure 17:
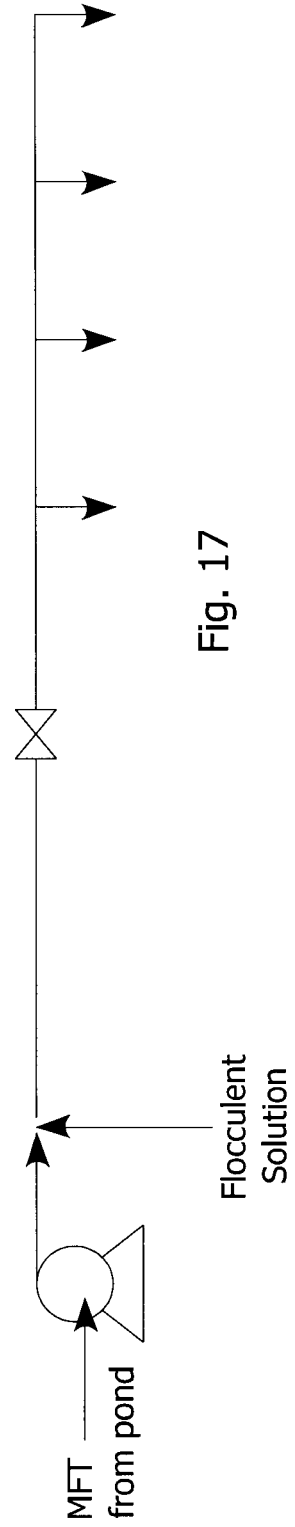
FIG. 17 is another schematic representation of treating mature fine tailings with a flocculent solution.
Figure 18:
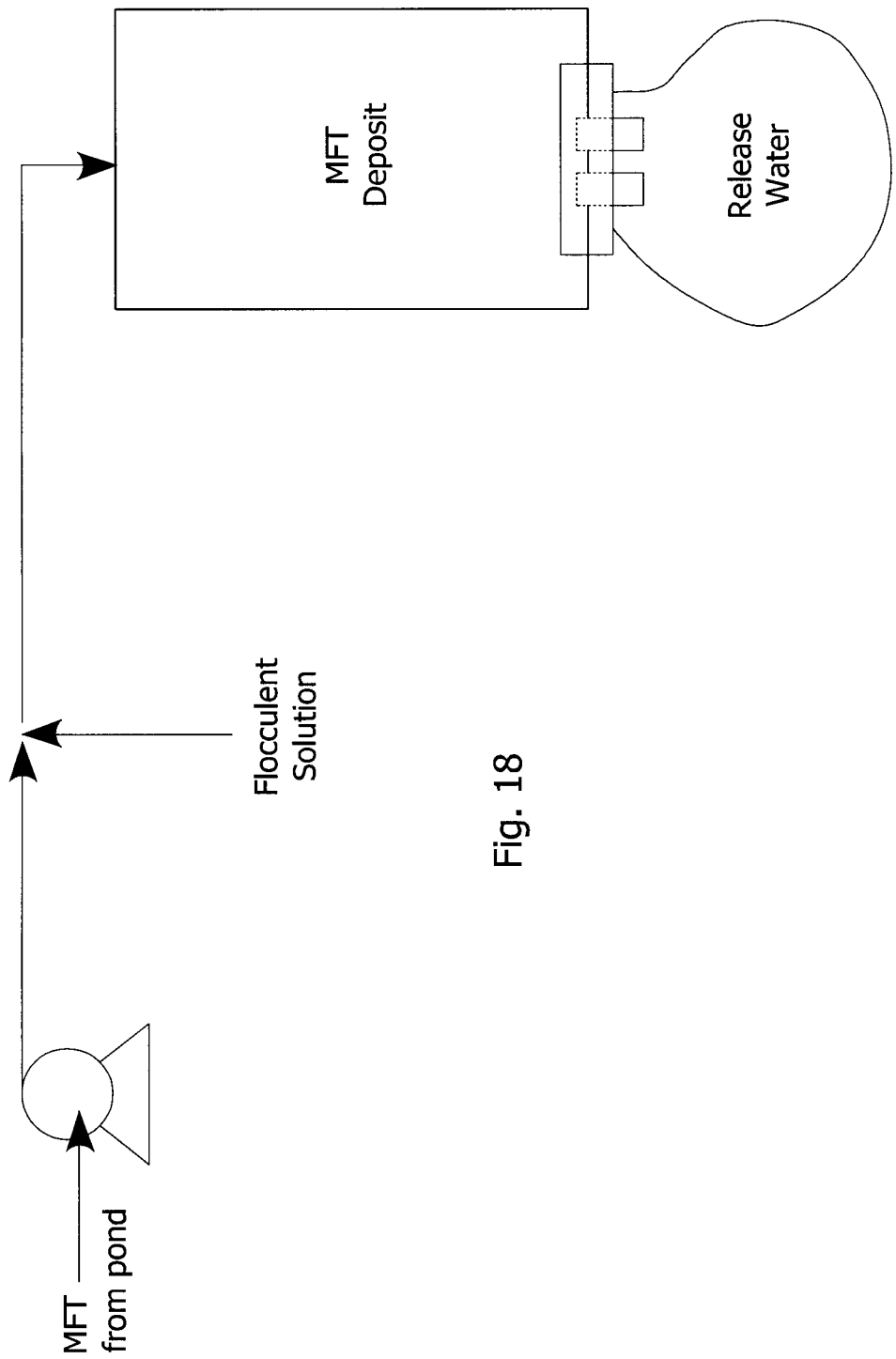
FIG. 18 is another schematic representation of treating mature fine tailings with a flocculent solution.

Trials were performed and showed that a flocculation reagent could be injected into MFT in-line followed by pipeline conditioning, deposition and drying. FIGS. 16-18 schematically illustrate different experimental setups that were used. For FIGS. 16 and 17, the flocculated MFT was deposited onto beaches and for FIG. 18 into a deposition cell.

The MFT was about 36 wt % solids and was pumped from a pond at flow rates between 300 and 720 gal/min. The flocculent solution was injected in-line at different locations. One of the flocculent reagents used was a 30% charge anionic polyacrylamide-sodium polyacrylate co-polymer with a molecular weight over 10,000,000. The flocculated MFT ws conditioned along a pipeline and then expelled out of spigots arranged in series.

Figure 19:
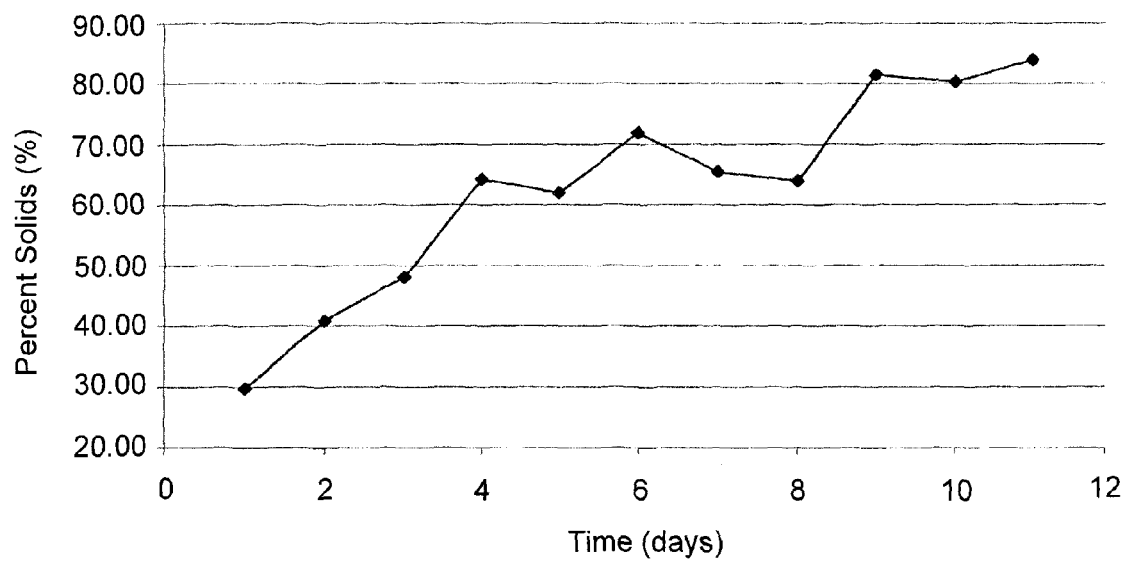
FIGS. 19 and 20 are graphs of percent solids as a function of time for deposited MFT showing drying times according to trial experimentation.
Figure 20:
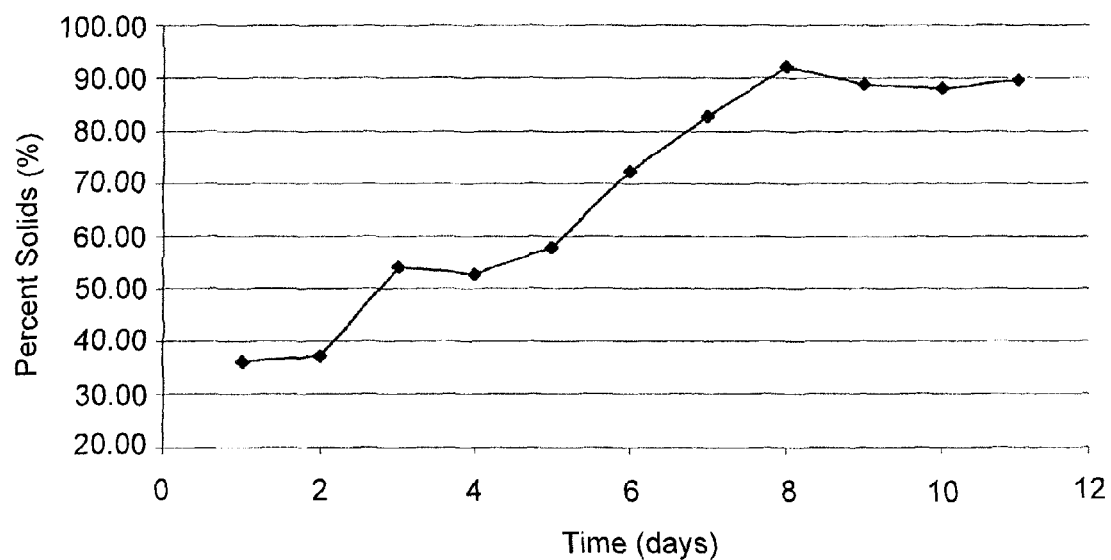

In order to monitor the progress of the drying, samples were taken and analyzed for percent solids. The drying times to achieve 75 wt % solids ranged from 5 to 7.5 days depending on the sample location. Deposition areas having a slope showed faster drying. FIGS. 19 and 20 show some results at two different sample points of the drying times of deposited MFT.

Dosages between 0.6 Kg to 1.1 Kg per dry tonne of MFT provided preferred drainage results, and much cleaner effluent water than those outside this range. Trials revealed that incorrect dosage may reduce dewatering for a number of reasons. If the dosage is too low, some of the MFT goes unflocculated and overall there is a lack of dewatering performance. Overdosing flocculent applications may also lead to reduced dewatering due to allowing water to become bound up in semi-gelled masses with the solids making it more difficult to provide conditioning sufficient to allow water release with the given pipeline dimensions and hydraulic conditions. Both of these situations were observed and dosage adjustments were made to compensate. In addition, water quality depends on dosage control. Overdosing or inadequate mixing (resulting in localised overdosing) resulted in poor water quality with at times over 1 wt % solids. Increased dosing control, the preferred dosage range and rapid initial mixing helped resolve water quality issues and improve dewatering and drying of the deposited MFT. Other observations noted that the deposited MFT dewatered and dried despite significant precipitation, thus resisting re-hydration from precipitation.

Reclamation of the MFT deposits was further observed as vegetation from seeds tossed on the deposition area was later noted to be growing well.

Example 7

One of the challenges to successful treating of MFT is the process variations encountered in operations. It may be desired to use a side injection nozzle to for mixing liquids into MFT. Using the mixing algorithm developed for the MFT pipeline reactor model, FIG. 21 compares a typical side injection nozzle to the orifice nozzle of FIG. 4 on a 2 inch pipeline for a range of MFT flows based on:

- The MFT is 30 wt % solids and modeled as a Herschel-Bulkley fluid with a yield stress of 2 Pa and high shear rate viscosity of 10 mPa s. Density was 1250 kg/m$^3$.
- The flocculent solution was modeled as Power Law fluid with n=0.267 and consistency index (k) of 2750 kg s$^{n-2}$/m. Density was 1000 kg/m$^3$ and the flow rate was 1/10 the MFT volume flow rate
- The orifice mixer had a 0.32 orifice ratio.
- The flow area for injecting the polymer solution was the same for both mixers.

Figure 21:
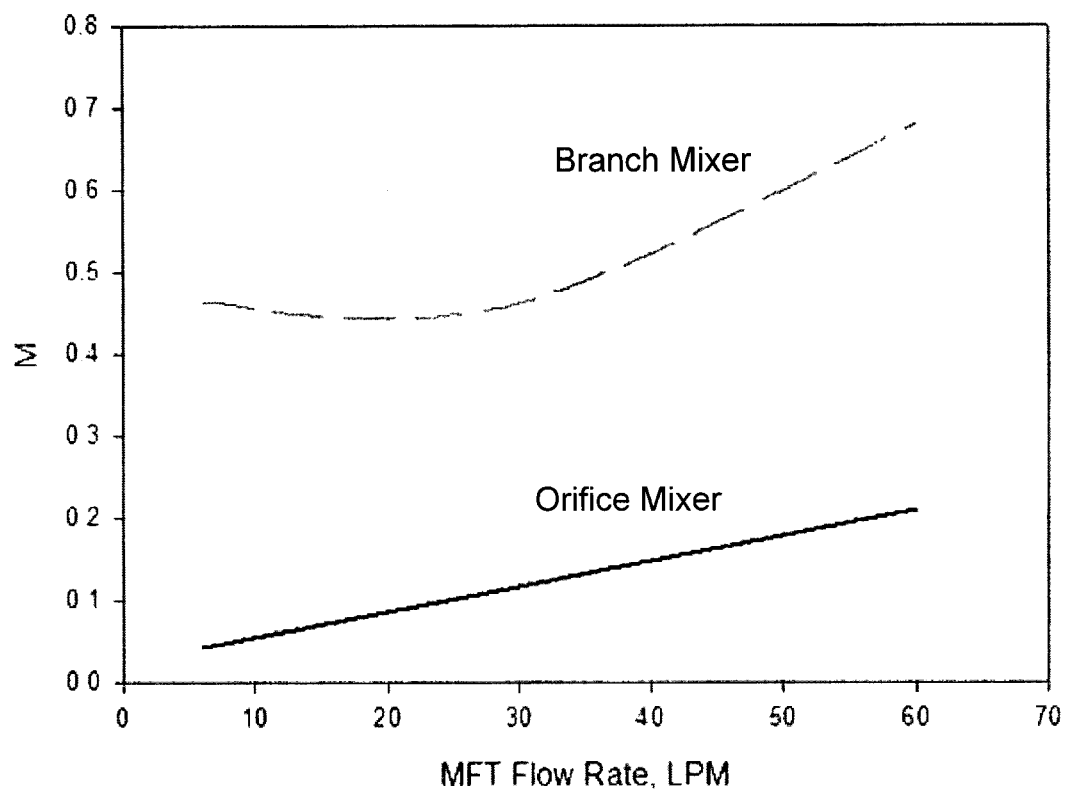
FIG. 21 is a graph of second moment M versus MFT flow rate for different mixers.

FIG. 21 illustrates that the orifice mixer of FIG. 4 provides significantly preferred mixing than the conventional side injection nozzle over the range of MFT flows.

The process of the present invention, which is a significant advance in the art of MFT management and reclamation, has been described with regard to preferred embodiments and aspects and examples. The description and the drawings are intended to help the understanding of the invention rather than to limit its scope. It will be apparent to one skilled in the art that various modifications may be made to the invention without departing from what has actually been invented.

The invention claimed is:

1. A process for drying oil sand fine tailings comprising water and fine solids in suspension in the water, the process comprising:
   providing an in-line flow of the fine tailings;
   continuously introducing a flocculant solution comprising a polymer flocculation reagent into the in-line flow of the fine tailings, to cause dispersion of the flocculant solution and commence flocculation of the fine tailings;
   subjecting the fine tailings to flocculation conditioning in-line to cause formation and rearrangement of flocs and increase the yield shear stress to form an in-line flow comprising flocculated fine tailings;
   subjecting the flocculated fine tailings to water release conditioning to stimulate release of water while avoiding over-shearing of the flocs and re-suspension of the fine solids into the water; and
   depositing the fine tailings on a land surface to allow the release of water, formation of a non-flowing fine tailings deposit and drying of the non-flowing fine tailings deposit on the land surface.

2. The process of claim 1, wherein the flocculation conditioning is performed so as to increase the yield shear strength of the fine tailings to an upper limit.

3. The process of claim 2, wherein the upper limit comprises a single maximum.

4. The process of claim 2, wherein the upper limit comprises a plurality of local maximums over time.

5. The process of claim 2, wherein the water release conditioning decreases the yield shear strength of the fine tailings below the upper limit.

6. The process of claim 1, wherein the water release conditioning is performed in-line prior to depositing the fine tailings.

7. The process of claim 6, wherein the flocculation conditioning and the water release conditioning comprise performing pipe wall shearing prior to depositing the fine tailings.

8. The process of claim 6, wherein the flocculation conditioning and the water release conditioning consist essentially of performing pipe wall shearing prior to depositing the fine tailings.

9. The process of claim 6, wherein the flocculation conditioning and the water release conditioning are controlled by varying in-line flow rate of the fine tailings in a pipe having predetermined dimensions.

10. The process of claim 6, wherein the flocculation conditioning and the water release conditioning are controlled by varying pipe dimensions through which the fine tailings flow.

11. The process of claim 10, wherein the pipe dimensions comprise the internal diameter or the length of the pipe or both.

12. The process of claim 1, wherein the water release conditioning comprises expelling and depositing the fine tailings under predetermined shearing conditions.

13. The process of claim 1, wherein the water release conditioning comprises mechanically shearing the non-flowing fine tailings deposit.

14. The process of claim 13, wherein mechanically shearing comprises driving a dozer through the non-flowing fine tailings deposit.

15. The process of claim 1, wherein the water release conditioning comprises mechanically shearing the fine tailings prior to depositing using a shearing apparatus.

16. The process of claim 15, wherein the shearing apparatus comprises baffles, an agitator, a mixer, or a rotary separator, or a combination thereof.

17. The process of claim 1, wherein the water release conditioning is performed so as to maintain the yield shear strength of the fine tailings above about 200 Pa for flocculated solids at the discharge of the pipeline.

18. The process of claim 1, wherein, upon depositing, the non-flowing fine tailings deposit has yield shear stress above 300 Pa.

19. The process of claim 1, wherein the non-flowing fine tailings deposit is a first deposit, and further comprising allowing the first deposit to dry to at least 75 wt % solids and then depositing a second deposit thereon.

20. The process of claim 1, wherein the fine tailings comprise between about 15 wt % and about 45 wt % solids.

21. The process of claim 20, wherein the fine tailings comprise between about 20 wt % and about 35 wt % solids.

22. The process of claim 21, wherein the fine tailings comprise at least 50 wt % of fines having a particle size less than 44 microns based on the total solids content.

23. The process of claim 1, wherein the flocculant solution comprises water and the polymer flocculation reagent completely dissolved therein.

24. The process of claim 1, wherein the polymer flocculation reagent comprises a 20%-30% charge anionic polymer.

25. The process of claim 1, wherein the flocculant solution has a lower density than the fine tailings and is continuously introduced into a central region of the in-line flow.

26. The process of claim 1, wherein continuously introducing the flocculant solution into the in-line flow of fine tailings comprises rapid mixing.

27. The process of claim 26, wherein, in the rapid mixing, the second moment M is between about 1.0 and about 2.0 at a downstream location about 5 pipe diameters from introducing the flocculant solution.

28. The process of claim 26, wherein the rapid mixing comprises:
   providing a mixing zone in the in-line flow of the fine tailings, the mixing zone comprising turbulence eddies which flow into a forward-flow region; and
   continuously introducing the flocculant solution into the in-line flow such that the flocculant solution disperses within the turbulence eddies and into the forward flow region.

29. The process of claim 28, wherein the flocculant solution is introduced directly into the turbulence eddies.

30. The process of claim 29, wherein turbulence eddies define an annular eddy region and the forward-flow region is defined inside the annular eddy region.

31. The process of claim 30, wherein the flocculant solution is introduced by jetting in the downstream direction of the in-line flow.

32. The process of claim 31, wherein the flocculant solution is introduced substantially collinearly with respect to the downstream direction of the in-line flow.

33. The process of claim 30, wherein the flocculant solution is introduced via a plurality of inlets distributed around and communicating with the annular eddy region.

34. The process of claim 33, wherein the annular eddy region and the forward-flow region are formed by:
providing an upstream pipe, a downstream pipe, and an injection device connected between the upstream and downstream pipes, the injection device comprising:
an annular plate defining a central orifice;
the inlets distributed around the annular plate and pointing downstream, the inlets communicating with a feed of the flocculant solution; and
forcing the in-line flow from the upstream pipe through and exiting the central orifice, thereby forming the forward-flow region in the downstream pipe and the annular eddy region proximate to the annular plate in the downstream pipe.

35. The process of claim 1, wherein the fine tailings are obtained from ongoing oil sand extraction operations.

36. The process of claim 1, further comprising imparting sufficient hydraulic pressure to the fine tailings upstream of injecting the flocculant solution so as to avoid downstream pumping.

37. The process of claim 1, wherein the non-flowing fine tailings deposit resists re-hydration from precipitation.

38. The process of claim 1, wherein providing the inline flow of fine tailings, continuously introducing the flocculant solution, flocculation conditioning and water release conditioning are performed in continuous mode in an integral pipeline reactor.

39. The process of claim 1, wherein the depositing is performed via a plurality of outlets located proximate to the ground.

40. The process of claim 1, wherein the flocculant solution and the fine tailings are non-Newtonian fluids.

41. A process for drying fine tailings comprising water and fine solids in suspension in the water, the process comprising:
providing an in-line flow of the fine tailings;
continuously introducing a flocculant solution comprising a polymer flocculation reagent into the in-line flow of the fine tailings, to cause dispersion of the flocculant solution and commence flocculation of the fine tailings;
subjecting the fine tailings to flocculation conditioning in-line to cause formation and rearrangement of flocs and increase the yield shear stress to form an in-line flow comprising flocculated fine tailings;
subjecting the flocculated fine tailings to water release conditioning to stimulate release of water while avoiding over-shearing of the flocs and re-suspension of the fine solids into the water; and
depositing the fine tailings on a land surface to allow the release of water, formation of a non-flowing fine tailings deposit and drying of the non-flowing fine tailings deposit on the land surface.

42. The process of claim 41, wherein the water release conditioning decreases the yield shear strength of the fine tailings below an upper limit.

43. The process of claim 41, wherein the water release conditioning is performed in-line prior to depositing the fine tailings.

44. The process of claim 43, wherein the flocculation conditioning and the water release conditioning comprise performing pipe wall shearing prior to depositing the fine tailings.

45. The process of claim 43, wherein the flocculation conditioning and the water release conditioning are controlled by varying in-line flow rate of the fine tailings in a pipe having predetermined dimensions.

46. The process of claim 43, wherein the flocculation conditioning and the water release conditioning are controlled by varying pipe dimensions through which the fine tailings flow.

47. The process of claim 41, wherein the water release conditioning comprises expelling and depositing the fine tailings under predetermined shearing conditions.

48. The process of claim 41, wherein the water release conditioning comprises mechanically shearing the non-flowing fine tailings deposit.

49. The process of claim 41, wherein the water release conditioning is performed so as to maintain the yield shear strength of the fine tailings above about 200 Pa for flocculated solids at the discharge of the pipeline.

50. The process of claim 41, wherein, upon depositing, the non-flowing fine tailings deposit has yield shear stress above 300 Pa.

51. The process of claim 41, wherein the non-flowing fine tailings deposit is a first deposit, and further comprising allowing the first deposit to dry to at least 75 wt % solids and then depositing a second deposit thereon.

52. The process of claim 41, wherein the fine tailings comprise between about 15 wt % and about 45 wt % solids.

53. The process of claim 52, wherein the fine tailings comprise between about 20 wt % and about 35 wt % solids.

54. The process of claim 53, wherein the fine tailings comprise at least 50 wt % of fines having a particle size less than 44 microns based on the total solids content.

55. The process of claim 41, wherein the flocculant solution comprises water and the polymer flocculation reagent completely dissolved therein.

56. The process of claim 41, wherein the flocculant solution has a lower density than the fine tailings and is continuously introduced into a central region of the in-line flow so as to avoid that the flocculant solution floating on top of the fine tailings.

57. The process of claim 41, wherein continuously introducing the flocculant solution into the in-line flow of fine tailings comprises rapid mixing characterized in that the second moment M is between about 1.0 and about 2.0 at a downstream location about 5 pipe diameters from introducing the flocculant solution.

58. The process of claim 41, wherein the fine tailings comprise oil sands fine tailings.

59. The process of claim 41, wherein the oil sands fine tailings are oil sands mature fine tailings.

60. The process of claim 41, wherein the fine tailings comprise colloidal fluids having non-Newtonian fluid behavior.

61. The process of claim 41, wherein the fine tailings are obtained from ongoing oil sand extraction operations.

62. The process of claim 41, wherein the flocculant solution and the fine tailings are non-Newtonian fluids.

63. A process for drying a colloidal fluid having non-Newtonian fluid behavior tailings comprising water and fine solids in suspension in the water, the process comprising:
- providing an in-line flow of the colloidal fluid;
- continuously introducing a flocculant solution comprising a polymer flocculation reagent into the in-line flow of the colloidal fluid, to cause dispersion of the flocculant solution and commence flocculation of the colloidal fluid;
- subjecting the colloidal fluid to flocculation conditioning in-line to cause formation and rearrangement of flocs and increase the yield shear stress to form an in-line flow comprising flocculated colloidal fluid;
- subjecting the flocculated colloidal fluid to water release conditioning to stimulate release of water while avoiding over-shearing of the flocs and re-suspension of the fine solids into the water; and
- depositing the colloidal fluid on a land surface to allow the release of water, formation of a non-flowing deposit and drying of the non-flowing deposit on the land surface.

64. A process for drying fine tailings, comprising:
- providing an in-line flow of the fine tailings;
- continuously introducing a flocculant solution comprising a flocculation reagent into the in-line flow of the fine tailings, to cause dispersion of the flocculant solution and commence flocculation of the fine tailings; wherein continuously introducing the flocculant solution into the in-line flow of fine tailings comprises:
  - providing an upstream pipe, a downstream pipe, and an injection device connected between the upstream and downstream pipes, the injection device comprising:
    - an annular plate defining a central orifice; and
    - inlets distributed around the annular plate and pointing downstream, the inlets communicating with a feed of the flocculant solution; and
  - forcing the in-line flow from the upstream pipe through and exiting the central orifice, thereby forming a forward-flow region in the downstream pipe and an annular eddy region proximate to the annular plate in the downstream pipe;
- subjecting the fine tailings to flocculation conditioning in-line to cause formation and rearrangement of flocs and increase the yield shear stress to form an in-line flow comprising flocculated fine tailings;
- subjecting the flocculated fine tailings to water release conditioning to stimulate release of water while avoiding over-shearing of the flocs; and
- depositing the fine tailings to allow the release of water, formation of a non-flowing fine tailings deposit and drying of the non-flowing fine tailings deposit.

65. The process of claim 64, wherein introducing the flocculant solution into the in-line flow of fine tailings is characterized in that the second moment M is between about 1.0 and about 2.0 in the downstream pipe at a downstream location about 5 pipe diameters from introducing the flocculant solution.

66. The process of claim 64, wherein the flocculant solution is introduced into the annular eddy region.

67. The process of claim 66, wherein the flocculant solution is introduced by jetting into the annular eddy region.

68. The process of claim 64, wherein the flocculant solution is introduced substantially co-linearly with respect to the downstream direction of the in-line flow.

69. The process of claim 64, wherein providing the in-line flow of fine tailings, continuously introducing the flocculant solution, flocculation conditioning and water release conditioning are performed in continuous mode in an integral pipeline reactor.

* * * * *